United States Patent
Komine et al.

(10) Patent No.: US 9,331,934 B2
(45) Date of Patent: May 3, 2016

(54) PACKET DISTRIBUTION SYSTEM, CONTROL DEVICE AND CONTROL METHOD FOR CONTROLLING DISTRIBUTION OF CONTENT PACKET

(71) Applicant: FUJITSU LIMITED, Kawasaki-shi, Kanagawa (JP)

(72) Inventors: Hiroaki Komine, Yamato (JP); Gaku Todokoro, Kawasaki (JP); Satoru Abe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 42 days.

(21) Appl. No.: 14/156,965

(22) Filed: Jan. 16, 2014

(65) Prior Publication Data
US 2014/0241371 A1 Aug. 28, 2014

(30) Foreign Application Priority Data
Feb. 22, 2013 (JP) ................................. 2013-033357

(51) Int. Cl.
*H04L 12/40* (2006.01)
*H04L 12/741* (2013.01)
*H04L 12/725* (2013.01)

(52) U.S. Cl.
CPC .............. *H04L 45/54* (2013.01); *H04L 45/306* (2013.01)

(58) Field of Classification Search
CPC ................................. H04L 63/10; H04L 45/44
See application file for complete search history.

(56) References Cited

U.S. PATENT DOCUMENTS

| | | | |
|---|---|---|---|
| 2003/0053458 A1 | 3/2003 | Okazaki | |
| 2005/0125528 A1* | 6/2005 | Burke, II | H04L 63/10 709/223 |
| 2012/0099482 A1* | 4/2012 | Shook | H04L 12/1403 370/259 |

FOREIGN PATENT DOCUMENTS

| | | |
|---|---|---|
| JP | 2003-69639 | 3/2003 |
| JP | 2007-129779 | 5/2007 |

* cited by examiner

*Primary Examiner* — Maharishi Khirodhar
(74) *Attorney, Agent, or Firm* — Staas & Halsey LLP

(57) ABSTRACT

A packet distribution system includes: a first transfer device that is placed on a boundary of a core network and near first and second terminal devices; a second transfer device that is placed on the boundary of the core network and near a content distribution device; and a control device that, when a first content packet is distributed to the first terminal device, a distribution request packet is transmitted from the second terminal device, and a second content packet newly distributed from a content distribution device to the second terminal device is detected by the second transfer device, causes the second transfer device to abandon the second content packet based on control information included in the second content packet, and causes the first transfer device to copy the first content packet distributed to the first terminal device, to the second terminal device.

12 Claims, 36 Drawing Sheets

| CONTENT ID | CONTENT |
|---|---|
| 100 | SPORT |
| 200 | NEWS |
| 300 | MUSIC |

CONTROL INFORMATION

| TOS | DESTINA-TION IP ADDRESS | CONTENT ID | TRANSFER MODE |
|---|---|---|---|
| 10 | 1.1.1.1 | 100 | TRANSFER |
| | | | |
| | | | |
| | | | |

| TOS | DESTINA-TION IP ADDRESS | CONTENT ID | BRANCH DESTINATION IP ADDRESS 1 | BRANCH DESTINATION IP ADDRESS 2 | BRANCH DESTINATION IP ADDRESS n |
|---|---|---|---|---|---|
| 10 | 1.1.1.1 | 100 | 1.1.1.1 | | |
| | | | | | |
| | | | | | |
| | | | | | |

| USER ID | TERMINAL IP ADDRESS | GATEWAY ID | BASE STATION ID | SERVICE DURATIVE CONTENT ID |
|---------|---------------------|------------|-----------------|------------------------------|
| 1001 | 1.1.1.1 | GW1 | 1-1 | 100 |
| 1002 | 2.2.2.2 | GW1 | 1-2 | |
| 1003 | 3.3.3.3 | GW3 | 3-1 | |
| | | | | |

| USER ID | TERMINAL IP ADDRESS | GATEWAY ID | BASE STATION ID | SERVICE DURATIVE CONTENT ID | |
|---|---|---|---|---|---|
| 1001 | 1.1.1.1 | GW1 | 1-1 | 100 | |
| 1002 | 2.2.2.2 | GW1 | 1-2 | 100 | REGIS-TRATION |
| 1003 | 3.3.3.3 | GW3 | 3-1 | | |
| | | | | | |

| TOS | DESTINATION IP ADDRESS | CONTENT ID | BRANCH DESTINATION IP ADDRESS 1 | BRANCH DESTINATION IP ADDRESS 2 | BRANCH DESTINATION IP ADDRESS n |
|---|---|---|---|---|---|
| 10 | 1.1.1.1 | 100 | 1.1.1.1 | 2.2.2.2 | |
| | | | | | |
| | | | | | |
| | | | | | |

REGISTRATION

S PACKET DISTRIBUTION SYSTEM

| | DESTINA-TION IP ADDRESS | TRANSMIS-SION SOURCE IP ADDRESS | | | | CONTENT ID | DISTRIBUTION STOP REQUEST |

CONTROL INFORMTION

FLAG
1:DISTRIBUTION STOP
0:ORDINARY DISTRIBUTION

| TOS | DESTINA-TION IP ADDRESS | CONTENT ID | TRANSFER MODE |
|---|---|---|---|
| 10 | 1.1.1.1 | 100 | TRANSFER |
| | | | |
| | | | |
| | | | |

} DELETION

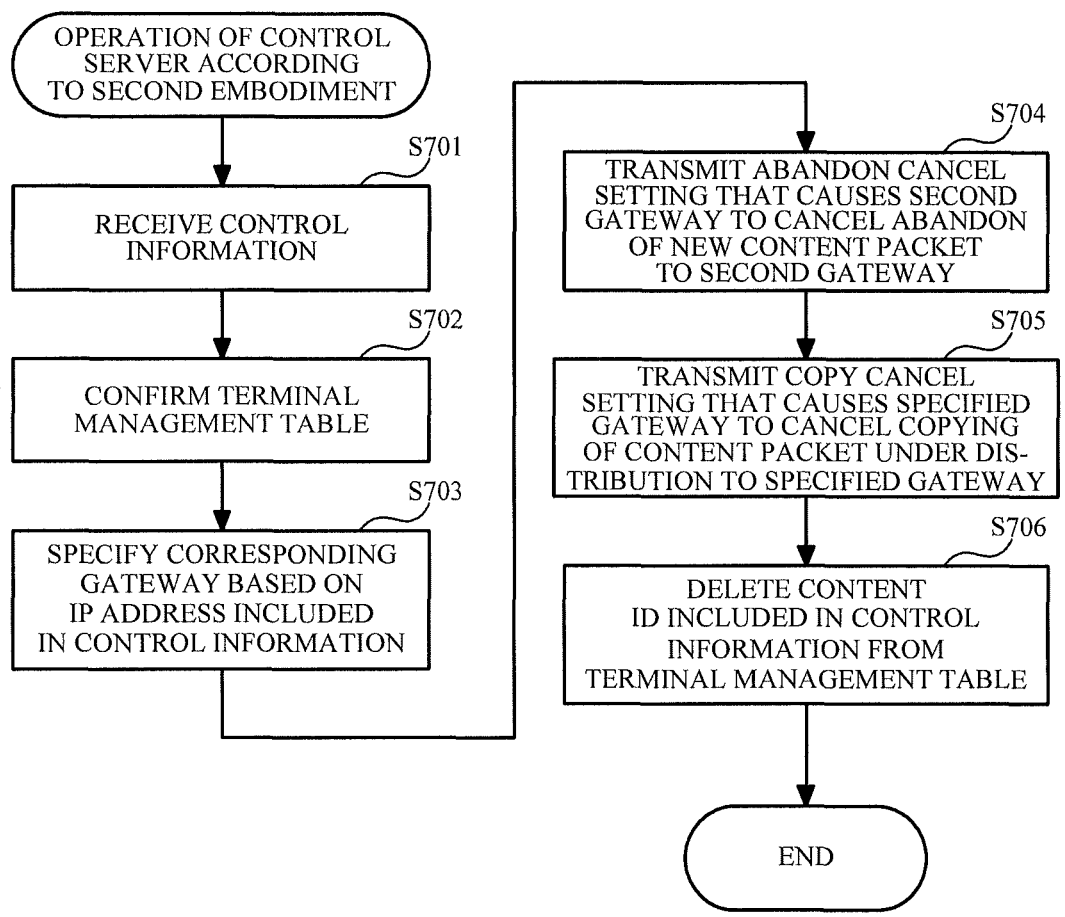

| TOS | DESTINA-TION IP ADDRESS | CONTENT ID | BRANCH DESTINATION IP ADDRESS 1 | BRANCH DESTINATION IP ADDRESS 2 | BRANCH DESTINATION IP ADDRESS n |
|---|---|---|---|---|---|
| 10 | 1.1.1.1 | 100 | 1.1.1.1 | | |
| | | | | | |
| | | | | | |
| | | | | | |

DELETION

FIG. 22

| TOS | DESTINA-TION IP ADDRESS | CONTENT ID | TRANSFER MODE | DISTRIBUTION IP ADDRESS |
|---|---|---|---|---|
| 10 | 1.1.1.1 | 100 | TRANSFER | 1.1.1.1 |
| 10 | 2.2.2.2 | 100 | ABANDON | 1.1.1.1 |
| | | | | |
| | | | | |

| TOS | DESTINA-TION IP ADDRESS | CONTENT ID | BRANCH DESTINATION IP ADDRESS 1 | BRANCH DESTINATION IP ADDRESS 2 | BRANCH DESTINATION IP ADDRESS n |
|---|---|---|---|---|---|
| 10 | 1.1.1.1 | 100 | | 2.2.2.2 | |
| | | | | | |
| | | | | | |
| | | | | | |

DELETION

FIG. 28

| TOS | DESTINATION IP ADDRESS | CONTENT ID | TRANSFER MODE | DISTRIBUTION DESTINATION IP ADDRESS 1 | DISTRIBUTION DESTINATION IP ADDRESS 2 |
|---|---|---|---|---|---|
| 10 | 1.1.1.1 | 100 | TRANSFER | 1.1.1.1 | |
| 10 | 2.2.2.2 | 100 | ABANDON | 1.1.1.1 | |
| | | | | | |
| | | | | | |

| TOS | DESTINA-TION IP ADDRESS | CONTENT ID | TRANSFER MODE | DISTRIBUTION DESTINATION IP ADDRESS 1 | DISTRIBUTION DESTINATION IP ADDRESS 2 | |
|---|---|---|---|---|---|---|
| 10 | 1.1.1.1 | 100 | TRANSFER | 1.1.1.1 | 3.3.3.3 | REGIS-TRATION |
| 10 | 2.2.2.2 | 100 | ABANDON | 1.1.1.1 | | |
| 10 | 3.3.3.3 | 100 | ABANDON | 3.3.3.3 | | REGIS-TRATION |
| | | | | | | |

| USER ID | TERMINAL IP ADDRESS | GATEWAY ID | BASE STATION ID | SERVICE DURATIVE CONTENT ID | |
|---------|---------------------|------------|-----------------|------------------------------|---|
| 1001 | 1.1.1.1 | GW1 | 1-1 | 100 | |
| 1002 | 2.2.2.2 | GW1 | 1-2 | 100 | |
| 1003 | 3.3.3.3 | GW3 | 3-1 | 100 | REGISTRATION |
|  |  |  |  |  | |

| TOS | DESTINA-TION IP ADDRESS | CONTENT ID | BRANCH DESTINATION IP ADDRESS 1 | BRANCH DESTINATION IP ADDRESS 2 | BRANCH DESTINATION IP ADDRESS n | |
|---|---|---|---|---|---|---|
| 10 | 3.3.3.3 | 100 | 3.3.3.3 | | | REGIS-TRATION |
| | | | | | | |
| | | | | | | |
| | | | | | | |

| TOS | DESTINA-TION IP ADDRESS | CONTENT ID | TRANSFER MODE | DISTRIBUTION DESTINATION IP ADDRESS 1 | DISTRIBUTION DESTINATION IP ADDRESS 2 | |
|---|---|---|---|---|---|---|
|  |  |  |  |  |  | DELE-TION |
| 10 | 2.2.2.2 | 100 | ABANDON | 1.1.1.1 | 3.3.3.3 |  |
| 10 | 3.3.3.3 | 100 | ABANDON | 3.3.3.3 |  |  |
|  |  |  |  |  |  |  |

REWRITE    REGISTRATION

| TOS | DESTINA-TION IP ADDRESS | CONTENT ID | BRANCH DESTINATION IP ADDRESS 1 | BRANCH DESTINATION IP ADDRESS 2 | BRANCH DESTINATION IP ADDRESS n |
|---|---|---|---|---|---|
| 10 | 1.1.1.1 | 100 | | 2.2.2.2 | |
| | | | | | |
| | | | | | |
| | | | | | |

DELETION under an access network, and causes the cache server to copy and distribute the packet (see e.g. Japanese Laid-open Patent Publication No. 2003-69639). According to the technique, useless use of interexchange channels used when the packet distributed from the server is relayed to the clients is omitted.

PACKET DISTRIBUTION SYSTEM, CONTROL DEVICE AND CONTROL METHOD FOR CONTROLLING DISTRIBUTION OF CONTENT PACKET

CROSS-REFERENCE TO RELATED APPLICATIONS

This application is based upon and claims the benefit of priority of the prior Japanese Patent Application No. 2013-033357 filed on Feb. 22, 2013, the entire contents of which are incorporated herein by reference.

FIELD

A certain aspect of the embodiments is related to a packet distribution system, a control device and a control method. A system, a control device and a control method that distribute a packet about a content are included as the packet distribution system.

BACKGROUND

There is known a technique that distributes a packet by broadcasting from a server to a plurality of clients. As the technique that distributes the packet by broadcasting, there is a technique that provides a cache server into a xDSL (xDigital Subscriber Line) accommodation device under an access network, and causes the cache server to copy and distribute the packet (see e.g. Japanese Laid-open Patent Publication No. 2003-69639). According to the technique, useless use of interexchange channels used when the packet distributed from the server is relayed to the clients is omitted.

SUMMARY

According to a packet distribution system disclosed herein, there is provided a packet distribution system including: a first transfer device that transfers a packet, and is placed on a boundary of a core network and near first and second terminal devices, each of the first and the second terminal devices transmitting a distribution request packet which requests the distribution of a same content; a second transfer device that transfers a packet, and is placed on the boundary of the core network and near a content distribution device, the content distribution device distributing a first content packet relating to the content to any one of the first and the second terminal devices which has transmitted the distribution request packet, according to the distribution request packet transmitted from any one of the first and the second terminal devices; a control device that controls the operation of the first and the second transfer devices; the control device including: an abandon controller that, when the first content packet is distributed to one of the first and the second terminal devices, the distribution request packet is transmitted from another one of the first and the second terminal devices, and a second content packet newly distributed from the content distribution device to the another one of the first and the second terminal devices is detected by the second transfer device, causes the second transfer device to abandon the second content packet based on control information included in the detected second content packet; and a copy controller that causes the first transfer device to copy the first content packet distributed to one of the first and the second terminal devices to the another one of the first and the second terminal devices.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 18A is a flowchart illustrating processing steps performed by the control server according to the second embodiment;

FIG. 18B is a diagram illustrating an example of the terminal management table;

FIG. 22 is a diagram illustrating an example of the second route table according to the third embodiment;

FIG. 28 is a diagram illustrating an example of the second route table according to the fourth embodiment;

DESCRIPTION OF EMBODIMENTS

In the above-mentioned conventional technique, when the clients require the broadcasting distribution of the packet of the server, a connection is established between the clients and the server for every request and the packet is distributed, a lot of packets flow into a core network which exists between the server and the access network. Since transfer processing is performed in the core network based on the addresses of the packets, when a lot of packets flow into the core network, a transfer load in the core network increases remarkably. Although the technology mentioned above omits the useless use of the interexchange channels, the number of network facilities increases because the cache server is newly provided.

A description will now be given of embodiments of the present invention with reference to attached drawings.

Figure 1:
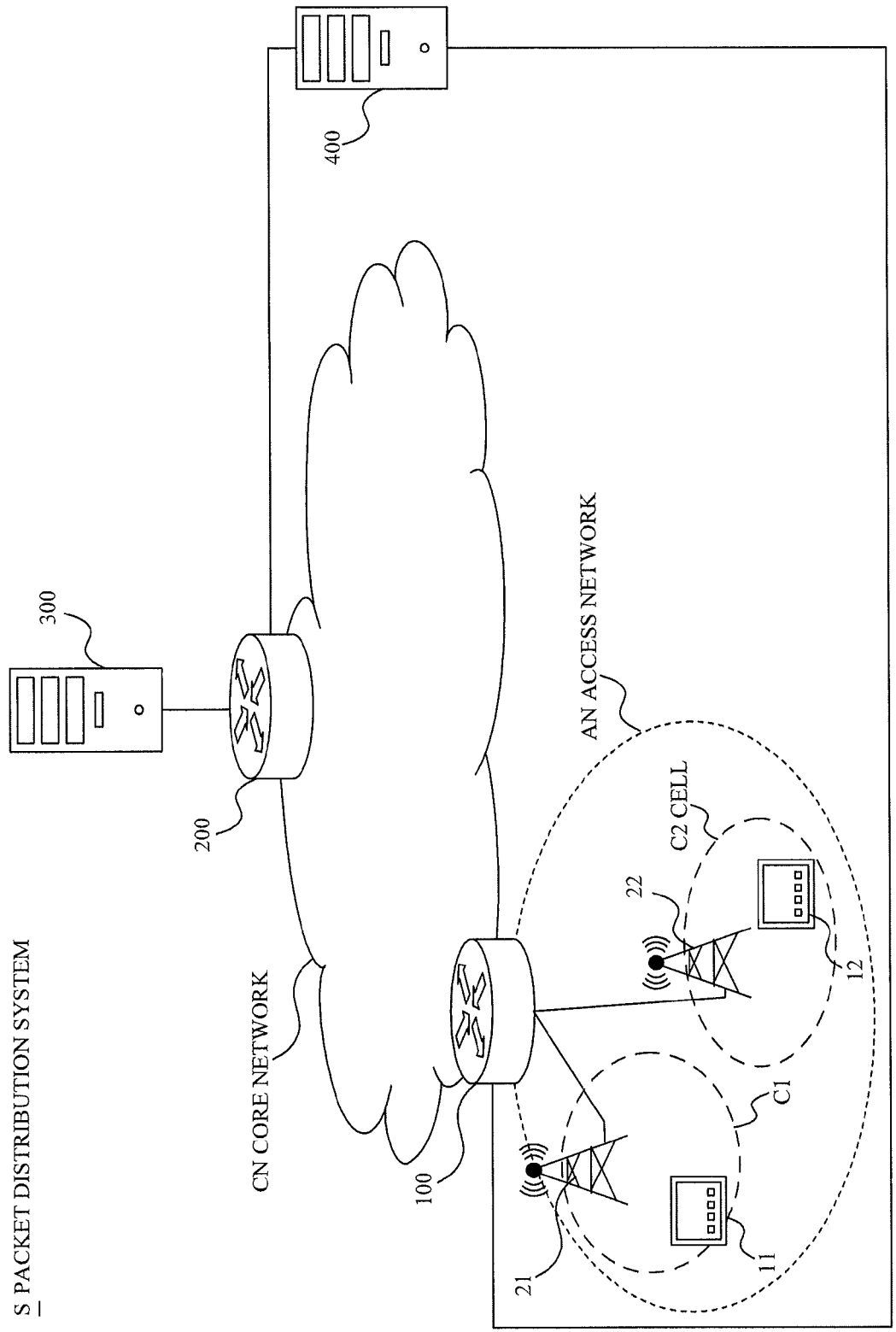
FIG. 1 is a diagram schematically illustrating the configuration of a packet distribution system.

(First Embodiment) FIG. 1 is a diagram schematically illustrating the configuration of a packet distribution system S. The packet distribution system S has terminal devices 11 and 12, base stations 21 and 22, a first gateway 100, a second gateway 200, a content server 300, and a control server 400. Here, each of the first gateway 100 and the second gateway 200 is also called an edge router or an edge switch, for example.

Each of the terminal devices 11 and 12 is operated by a user, and transmit a distribution request packet that requests distribution of the same content by wire or wireless communication. Each of the terminal devices 11 and 12 receives a content packet according to the distribution request packet. A content, such as a sport, music, or news, are included in a content packet. Each of the terminal devices 11 and 12 outputs the content according to the received content packet. For example, when the user wants to view a sport content about a sport with the terminal device 11, the user operates the terminal device 11 and requests distribution of the sport content to the terminal device 11. The terminal device 11 gives a content ID which identifies the sport content to the distribution request packet, and transmits the distribution request packet. When the terminal device 11 receives the content packet about the sport content, the terminal device 11 outputs the sport content by at least one of sound and display. Thus, the user can view the requested contents with the terminal device 11. Here, in FIG. 1, each of the terminal devices 11 and 12 is illustrated as a mobile type terminal device (a mobile type terminal device), but it may be a desktop type terminal device.

The base stations 21 and 22 are connected to the first gateway 100 by wire communication. The base stations 21 and 22 receive distribution request packets from the terminal devices 11 and 12, respectively. The base stations 21 and 22 transmit content packets to the terminal devices 11 and 12 wirelessly. The base stations 21 and 22 form cells C1 and C2 which are ranges in which the wireless communication is possible, respectively. More specifically, the base station 21 can wirelessly communicate with the terminal device 11 which exist in the cell C1. The base station 22 can wirelessly communicate with the terminal device 12 which exist in the cell C2. An access network AN is configured by gathering together the cells C1 and C2 which the base stations 21 and 22 form. In FIG. 1, the access network is indicated as a wireless access network. Here, each of the cells C1 and C2 is called a coverage, for example.

The first gateway 100 is placed near the terminal devices 11 and 12 on a boundary of a core network CN. The core network CN connects the first gateway 100 and the second gateway 200. The first gateway 100 transfers the distribution request packets received from the base stations 21 and 22, to the second gateway 200. The first gateway 100 transfers the content packets transferred from the second gateway 200, to the base stations 21 and 22. The first gateway 100 performs other various operations. Here, the core network CN includes at least one of routers and layer-3 switches. Each router is called a core router, for example. Each layer-3 switch is called a core switch, for example. Wires are connected between the routers, the layer-3 switches, and the router and the layer-3 switch. Each of the routers and the layer-3 switches transfers the packet, so that the packet is transmitted and received between the first gateway 100 and the second gateway 200. Here, the core network CN is called, for example, a basic trunk network, a backbone, a junction network, or the like.

The second gateway 200 is placed near the content server 300 and on the boundary of the core network CN. The second gateway 200 transfers the distribution request packets received from the first gateway 100, to the content server 300. The second gateway 200 transfers the content packets distributed from the content server 300, to the first gateway 100. The second gateway 200 performs other various operations.

The content server 300 receives the distribution request packets transferred from the second gateway 200. The content server 300 extracts contents according to content IDs given to the distribution request packets. The content server 300 gives the extracted contents to the content packets, respectively. The content server 300 distributes the content packets to the terminal devices 11 and 12 which have transmitted the distribution request packets, respectively.

The control server 400 is connected to the base stations 21 and 22, the first gateway 100 and the second gateway 200. In FIG. 1, the connection between the base stations 21 and 22, and the control server 400 is omitted. The control server 400 controls the operation of the base stations 21 and 22, the first gateway 100 and the second gateway 200. The details of the control server 400 are mentioned later.

Next, the details of the first gateway 100, the second gateway 200, the content server 300 and the control server 400 are mentioned later.

First, a description will be given of the details of the content server 300, with reference to FIGS. 2A, 2B, 3A and 3B.

Figures 2A, 2B:
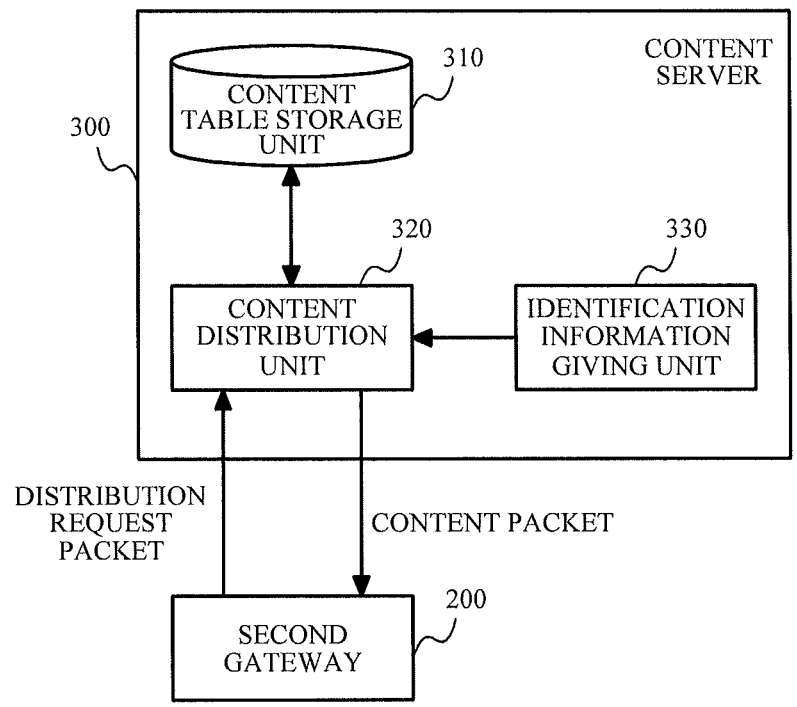
FIG. 2A is a block diagram illustrating an example of a content server.
FIG. 2B is a diagram illustrating an example of a content table.
Figures 3A, 3B:
FIG. 3A is a diagram illustrating an example of a format of a distribution request packet.
FIG. 3B is a diagram illustrating an example of a format of a content packet.

FIG. 2A is a block diagram illustrating an example of the content server 300. FIG. 2B is a diagram illustrating an example of a content table. FIG. 3A is a diagram illustrating an example of a format of the distribution request packet. FIG. 3B is a diagram illustrating an example of a format of the content packet. The content server 300 includes a content table storage unit 310, a content distribution unit 320, and an identification information giving unit 330.

The content table storage unit 310 stores the content table. The content table includes a content ID and a content as content information, as illustrated in FIG. 2B. The content ID is identification information for identifying the content. The content is a video, an image (a moving image or a static image), a music, a voice, a letter, a text or these combinations which make a specific content a main purpose.

The content ID and the content are associated with each other. For example, a content "sport" is associated with a content ID "100". For example, when the content ID "100" is specified, a sport movie, a sport moving image, a live voice of a sport and so on are distributed. For example, when the content ID "200" is specified, text broadcasting of news is distributed. For example, when the content ID "300" is specified, the music is distributed. Here, a live content is included in the content.

The content distribution unit 320 receives the distribution request packets transferred from the second gateway 200. A destination IP address, a sender IP address, and a content ID are included in each distribution request packet, as illustrated in FIG. 3A. For example, an IP address of the content server 300 is included in the destination IP address. An IP address of the terminal device 11 is included in the sender IP address. A content ID required by the terminal device 11 is included in the content ID. The content distribution unit 320 extracts the content from the content table storage unit 310 based on the content ID included in the distribution request packet. The content distribution unit 320 gives the extracted content to the content packet, as illustrated in FIG. 3B. When a TOS (Type of Service) described later is given to the content packet, the content distribution unit 320 distributes the content packet. The content distribution unit 320 distributes the sender IP address of the content packet as the IP address of the content server 300, and distributes the destination IP address as the IP address of the terminal device 11, for example.

The identification information giving unit 330 gives the identification information to a TOS (Type of Service) area in the content packet. The identification information is information for identifying whether the distribution uses the packet distribution system according to the present embodiment. The identification information giving unit 330 gives a TOS "10" which is a predesignated value as the identification information, to the content packet. An administrator who manages the packet distribution system may decide a value of the TOS suitably. Since the TOS is given to the content packet, each of elements (i.e., the router, the switch, and the base station) in the core network and the access network can identify the content packet is a content packet which the packet distribution system according to the present embodiment has used. Control information is constituted by a pair of the destination IP address, the TOS, and the content ID, as illustrated in FIG. 3B. The control information serves as an opportunity which works the control server 400.

Next, a description will be given of the details of the second gateway 200, with reference to FIGS. 4A and 4B.

Figures 4A, 4B:
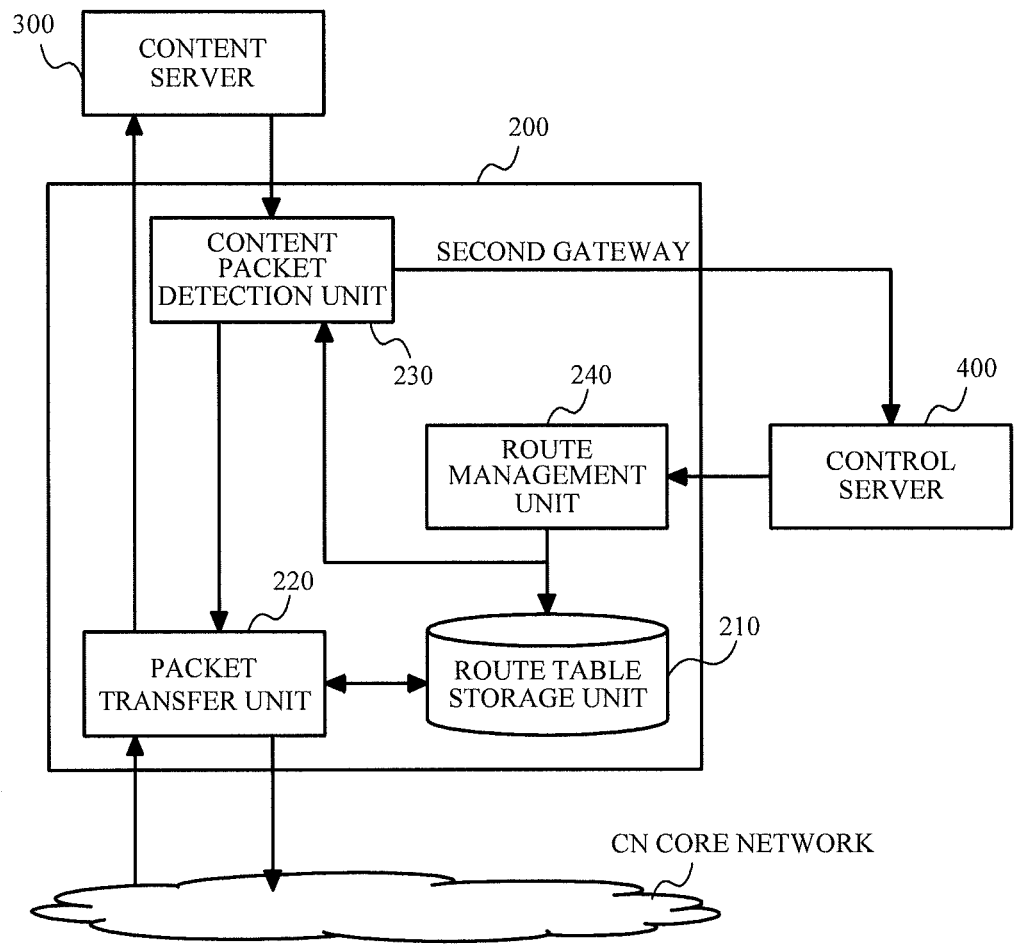
FIG. 4A is a block diagram illustrating an example of a second gateway.
FIG. 4B is a diagram illustrating an example of a second route table.

FIG. 4A is a block diagram illustrating an example of the second gateway 200. FIG. 4B is a diagram illustrating an example of a second route table. The second gateway 200 includes a route table storage unit 210, a packet transfer unit 220, a content packet detection unit 230 and a route management unit 240, as illustrated in FIG. 4A.

The route table storage unit 210 stores a second route table. The second route table includes the TOS, the destination IP address, the content ID and a transfer mode as route information, as illustrated in FIG. 4B. In the transfer mode, there are "transfer" that transfers the content packet and "abandon" that abandons the content packet. FIG. 4B illustrates that the content packet including the TOS "10", the destination IP address "1.1.1.1", and the content ID "100" is transferred.

The packet transfer unit 220 transfers the distribution request packet and the content packet. When the packet transfer unit 220 receives the distribution request packet, the packet transfer unit 220 transfers the received distribution request packet to the content server 300. When the packet transfer unit 220 receives the content packet, the packet transfer unit 220 confirms the second route table, and determines whether to transfer the content packet. The packet transfer unit 220 transfers the content packet to the first gateway 100 or abandons the content packet depending on a result of the confirmation of the second route table.

The content packet detection unit 230 receives the content packet distributed from the content server 300. After the content packet detection unit 230 receives the content packet, the content packet detection unit 230 confirms the second route table. The content packet detection unit 230 determines whether route information partially identical with the control information (i.e., a pair of the destination IP address, the TOS and the content ID) included in the received content packet is included in the second route table. That is, the content packet detection unit 230 determines whether the route information except the transfer mode is identical with the control information. When it is determined that there is no information identical with the control information, the content packet detection unit 230 detects the received content packet as a new content packet. When the content packet detection unit 230 detects the new content packet, the content packet detection unit 230 transmits the control information to the control server 400. The content packet detection unit 230 transmits the content packet to the packet transfer unit 220 regardless of whether the control information is transmitted to the control server 400.

The route management unit 240 manages the route table storage unit 210. The route management unit 240 updates the second route table based on various setting information transmitted from the control server 400. Specifically, the route information is newly additionally registered, the route information is deleted, or the transfer mode is rewritten. Thereby, the packet transfer unit 220 transfers or abandons the content packet based on the updated second route table.

Next, a description will be given of the details of the first gateway 100, with reference to FIGS. 5A and 5B.

Figures 5A, 5B:
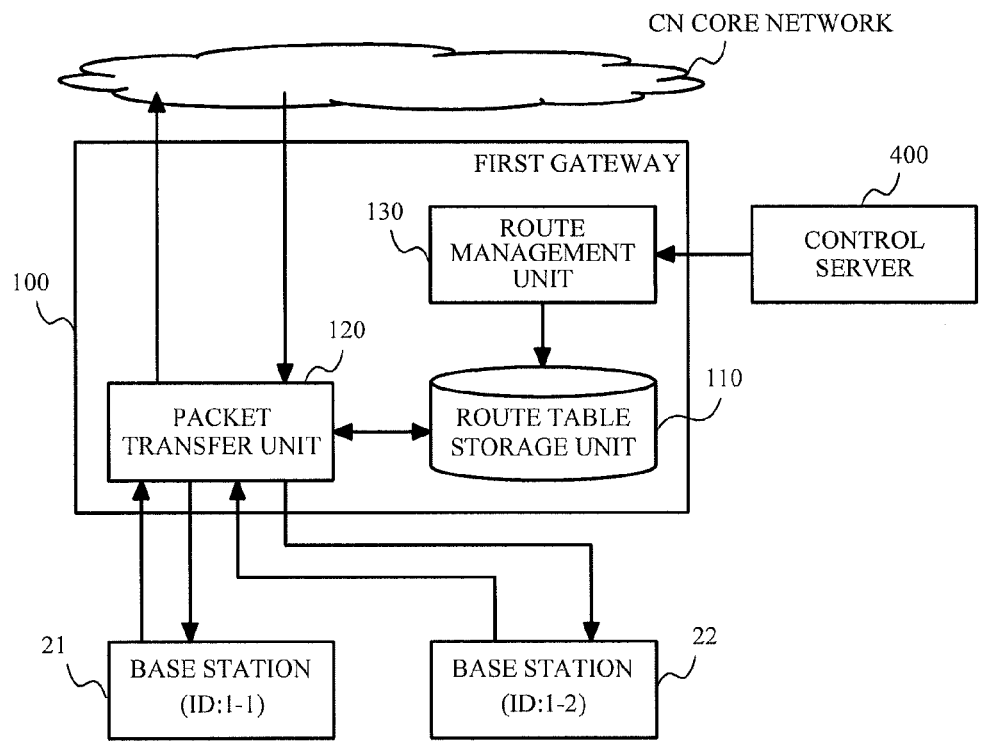
FIG. 5A is a block diagram illustrating an example of a first gateway.
FIG. 5B is a diagram illustrating an example of a first route table.

FIG. 5A is a block diagram illustrating an example of the first gateway 100. FIG. 5B is a diagram illustrating an example of a first route table. The first gateway 100 includes a route table storage unit 110, a packet transfer unit 120, and a route management unit 130, as illustrated in FIG. 5A.

The route table storage unit 110 stores the first route table. As illustrated in FIG. 5B, the first route table includes the TOS, the destination IP address, the content ID, a branch destination IP address 1, a branch destination IP address 2, . . . and a branch destination IP address n, as the route information. Here, in FIG. 5B, branch destination IP addresses 3 to n-1 are omitted. A transfer destination IP address of the content packet in which the received content packet is copied is registered into branch destination IP addresses 1 to n. The details are mentioned later, but when an IP address "2.2.2.2" is registered with the branch destination IP address 2 in FIG. 5B for example, the received content packet is copied, and the copied content packet is transferred to the terminal device 12 having the IP address "2.2.2.2".

The packet transfer unit 120 transfers the distribution request packet and the content packet. When the packet transfer unit 120 receives the distribution request packet, the packet transfer unit 120 transfers the received distribution request packet to the second gateway 200. When the packet transfer unit 120 receives the content packet, the packet transfer unit 120 confirms the first route table, and determines whether to copy the content packet. When the packet transfer unit 120 determines not to copy the received content packet as a result of the confirmation of the first route table, the packet transfer unit 120 transfers the received content packet to any one of the base stations 21 and 22 without copying. When the packet transfer unit 120 determines to copy the received content packet as a result of the confirmation of the first route table, the packet transfer unit 120 copies the received content packet, transfers the received content packet to any one of the base stations 21 and 22, and transfers the copied content packet to other one of the base stations 21 and 22.

The route management unit 130 manages the route table storage unit 110. The route management unit 130 updates the first route table based on various setting information transmitted from the control server 400. Specifically, the route information is newly additionally registered, the route information is deleted, or the branch destination IP addresses 1 to n are rewritten. Thereby, the packet transfer unit 120 copies or cancels copying the content packet based on the updated first route table.

Next, a description will be given of the details of the control server 400, with reference to FIGS. 6A and 6B.

Figures 6A, 6B:
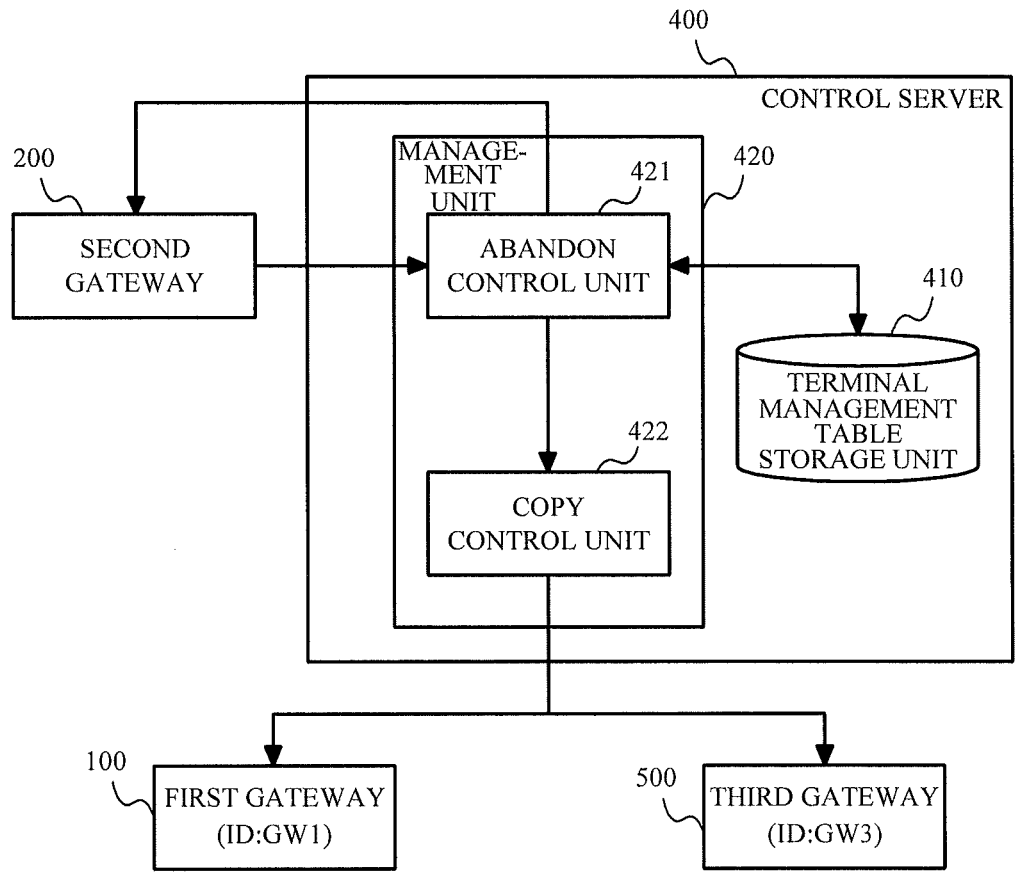
FIG. 6A is a block diagram illustrating an example of a control server.
FIG. 6B is a diagram illustrating an example of a terminal management table.

FIG. 6A is a block diagram illustrating an example of the control server 400. FIG. 6B is a diagram illustrating an example of a terminal management table. The control server 400 includes a terminal management table storage unit 410 and a management unit 420, as illustrated in FIG. 6A.

The terminal management table storage unit 410 stores the terminal management table. The terminal management table includes a user ID, a terminal IP address, a gateway ID, a base station ID and a service durative content ID as terminal management information, as illustrated in FIG. 6B. The terminal management information except for the service durative content ID is registered in advance. The terminal management table may be divided into a first management table that manages a correspondence relationship between the gateway ID, the base station ID and the service durative content ID, and a second management table that manages a correspondence relationship between the user ID, the terminal IP address and the gateway ID.

The user ID is identification information for identifying a user. The terminal IP address is an IP address assigned to each of the terminal devices 11 and 12. For example, an IP address "1.1.1.1" is assigned to the terminal device 11. An IP address "2.2.2.2" is assigned to the terminal device 12. The gateway ID is identification information for identifying a gateway. For example, a gateway ID "GW1" is assigned to the first gateway 100. A gateway ID "GW3" is assigned to a third gateway 500. The base station ID is identification information for identifying a base station. For example, a base station ID "1-1" is assigned to the base station 21. A base station ID "1-2" is assigned to the base station 22. A base station ID "3-1" is assigned to the base station 23 described later. The service durative content ID is a content ID of the content which is distributed to the terminal device 11, 12 or the like. FIG. 6B illustrates that the content of the content ID "100" is distributing to the terminal device 11. In addition, FIG. 6B illustrates that the content is not distributing to the terminal device 12, and the terminal device 13 described later. Thus, the content which the user is viewing, and the terminal devices 11 to 13 in which the distribution route of the content is specified are managed in the terminal control table. For example, the user of the user ID "1001" is viewing the content of the content ID "100" distributed by way of the gateway ID "GW1" and the base station ID "1-1", by using the terminal device 11 to which the terminal IP address "1.1.1.1" is assigned.

The management unit 420 manages the distribution route of the content packet. The management unit 420 includes an abandon control unit 421 and a copy control unit 422. The abandon control unit 421 transmits an abandon setting that causes the second gateway 200 to abandon a new content packet, to the second gateway 200 based on the control information transmitted from the second gateway 200. Thereby, the second gateway 200 abandons the new content packet. In addition, the abandon control unit 421 performs required operation based on various information transmitted from the second gateway 200. The copy control unit 422 transmits a copy setting that causes the first gateway 100 to copy the content packet distributed to one of the terminal devices 11 and 12 to the other thereof as a transfer destination, to the first gateway 100 based on the operation of the abandon control unit 421, for example. Thereby, the first gateway 100 copies the distributed content packet. The distributed content packet is continuously transmitted to one of the terminal devices 11 and 12. The copied content packet is newly transmitted to the other of the terminal devices 11 and 12.

Next, the hardware configuration of the first gateway 100, the second gateway 200, the content server 300, and the control server 400 are explained. Here, the content server 300 basically has the same configuration as the control server 400. The first gateway 100 and the second gateway 200 substantially have the same configuration as the control server 400 except for a HDD 400d, a drive device 400h and so on. Therefore, the control server 400 is explained as an example.

Figure 7:
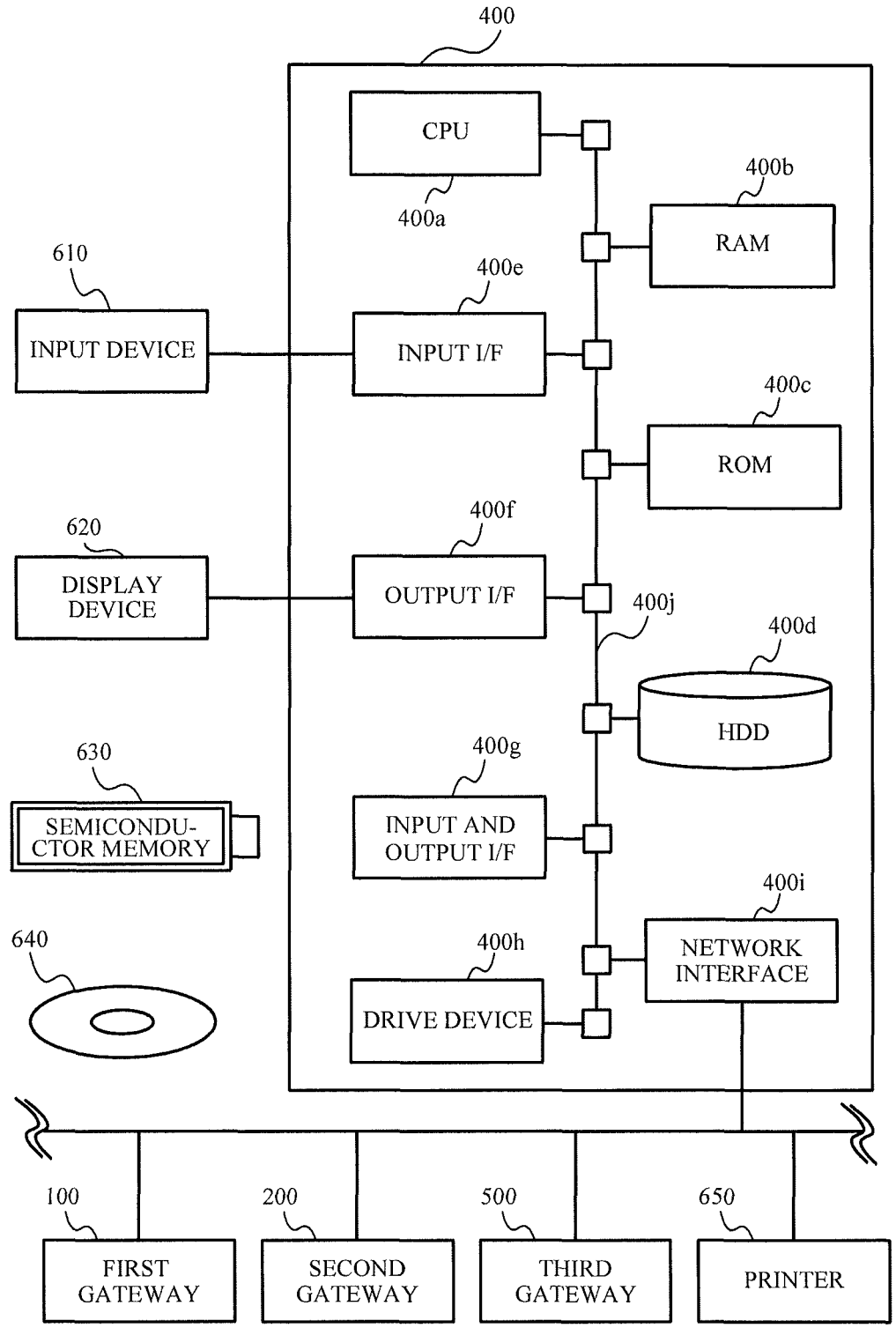
FIG. 7 is a diagram illustrating an example of the hardware configuration of the control server.

FIG. 7 is a diagram illustrating an example of the hardware configuration of the control server 400. The control server 400 includes a Central Processing Unit (CPU) 400a, a Random Access Memory (RAM) 400b, a Read Only Memory (ROM) 400c, and a Hard Disc Drive (HDD) 400d. The control server 400 includes an input Interface (I/F) 400e, an output I/F 400f, and an input and output I/F 400g. The control server 400 also includes a drive device 400h and a network interface 400i. These devices 400a to 400i are mutually connected by a bus 400j. The CPU 400a and the RAM 400b collaborate at least, so that a computer is achieved.

An input device 610 is connected to the input Interface (I/F) 400e. The input device 610 is a keyboard, a mouse, and so on, for example. A display device 620 is connected to the output I/F 400f. The display device 620 is a liquid crystal display, for example. A semiconductor memory 630 is connected to the input and output I/F 400g. The semiconductor memory 630 is a Universal Serial Bus (USB) memory, a flash memory, or the like, for example. The input and output I/F 400g reads out a program and data stored into the semiconductor memory 630. The input I/F 400e and the input and output I/F 400g include USB ports, respectively, for example.

A portable recording medium 640 is inserted into the drive device 400h. The portable recording medium 640 is a removable disk, such as a Compact Disc (CD)-ROM, a Digital Versatile Disc (DVD), for example. The drive device 400h reads out a program and data recorded into the portable recording medium 640. The network interface 400i includes a Local Area Network (LAN) interface (e.g. a LAN card, or a network adapter). The first gateway 100, the second gateway 200, the third gateway 500 and a printer 650 are connected to the network interface 400i.

The above-mentioned RAM 400b reads out a control program stored into any one of the ROM 400c, the HDD 400d and the semiconductor memory 630. The RAM 400b reads out a control program stored into the portable recording medium 640. The CPU 400a performs the read-out control program, so that the abandon control unit 421 and the copy control unit 422 of the control server 400 are achieved. Moreover, the CPU 400a performs the read-out control program, so that a control method by the control server 400 as described later is performed. Here, the control program needs to respond to a flowchart mentioned later.

Next, a description will be given of the whole operation of the packet distribution system S, with reference to FIGS. 8 and 9.

Figure 8:
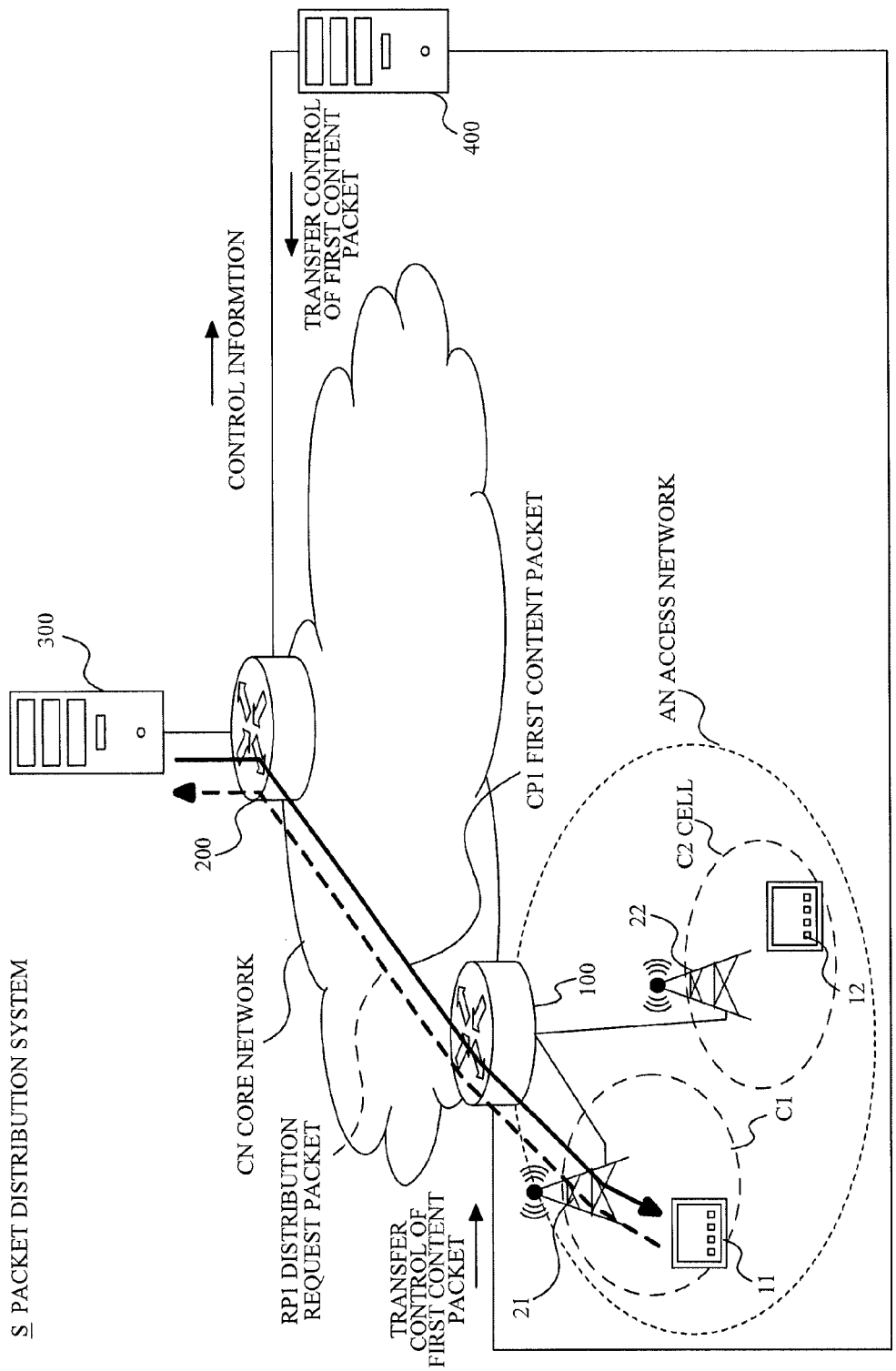
FIG. 8 is a diagram illustrating an example of the operation of the packet distribution system according to a first embodiment.

FIG. 8 is a diagram illustrating an example of the operation of the packet distribution system S according to a first embodiment. When the terminal device 11 transmits a distribution request packet RP1 to the content server 300 as illustrated in FIG. 8, the content server 300 establishes a connection with the terminal device 11. Next, the content server 300 distributes a first content packet CP1 to the terminal device 11 based on the distribution request packet. That is, the distribution of unicast is performed between the terminal device 11 and the content server 300.

When the second gateway 200 receives the first content packet CP1, the second gateway 200 compares the second route table with the control information included in the first content packet CPI, and determines whether a new content packet has been detected. When the control information is not included in the second route table, the second gateway 200 determines that the new content packet has been detected, and transmits the control information to the control server 400.

The control server 400 compares the destination IP address included in the control information with the terminal management table, and specifies the gateway ID corresponding to the destination IP address. The control server 400 confirms the service durative content ID based on the specified gateway. When a content ID identical with the content ID included in the control information does not exist as a result of the confirmation of the service durative content ID, the control server 400 determines that the distribution is first distribution, and transmits a transfer setting that causes the first gateway 100 and the second gateway 200 to transfer the first content packet CP1, to both of the first gateway 100 and the second gateway 200. After the transmission, the control server 400 registers the content ID included in the control information into the service durative content ID of the terminal management table (see FIG. 6B).

The first gateway 100 and the second gateway 200 update the first route table and the second route table based on the received transfer setting, respectively. Thereby, the first content packet CP1 is distributed to the terminal device 11 as illustrated in FIG. 8. The user of the user ID "1001" can view the content included in the first content packet CPI distributed to the terminal device 11.

Figure 9:
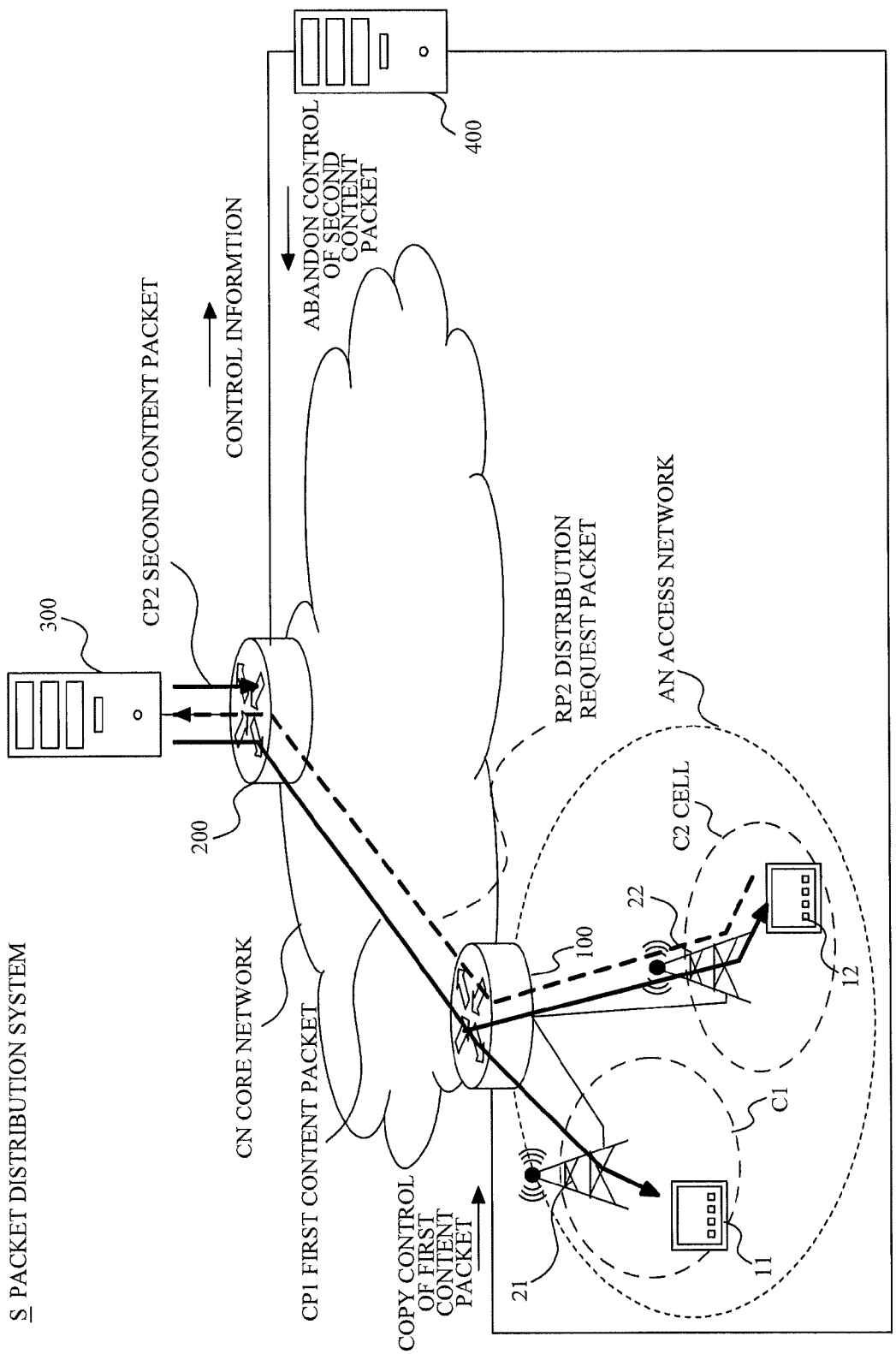
FIG. 9 is a diagram illustrating another example of the operation of the packet distribution system according to the first embodiment.

FIG. 9 is a diagram illustrating another example of the operation of the packet distribution system S according to the first embodiment. As described above, when the terminal device 12 transmits a distribution request packet RP2 to the content server 300 in a state where the first content packet CP1 is distributed to the terminal device 11, the content server 300 distributes a second content packet CP2 according to the distribution request packet RP2, to the terminal device 12.

When the second gateway 200 receives the second content packet CP2, the second gateway 200 compares the second route table with the control information included in the second content packet CP2, and determines whether a new content packet has been detected. When the control information is not included in the second route table, the second gateway 200 determines that the new content packet has been detected, and transmits the control information to the control server 400.

The control server 400 compares the destination IP address included in the control information with the terminal management table, and specifies the gateway ID corresponding to the destination IP address. The control server 400 confirms the service durative content ID based on the specified gateway ID. When a content ID identical with the content ID included in the control information exists as a result of the confirmation of the service durative content ID, the control server 400 determines that the distribution is not first distribution, transmits an abandon setting that causes the second gateway 200 to abandon the second content packet CP2 to the second gateway 200, and transmits a copy setting that causes the first gateway 100 to copy the first content packet CP1 to the first gateway 100. After the transmission, the control server 400 registers the content ID included in the control information into the service durative content ID of the terminal management table.

The second gateway 200 updates the second route table based on the received abandon setting. Thereby, the second content packet CP2 is abandoned by the second gateway 200, as illustrated in FIG. 9. The first gateway 100 updates the first route table based on the received copy setting. Thereby, the first content packet CP1 is copied by the first gateway 100, as illustrated in FIG. 9. At this time, the destination IP address of the copied first content packet CP1 is rewritten to the IP address of the terminal device 12, based on the updated first route table. Then, the first content packet CP1 is distributed to the terminal device 11. The copied first content packet CP1 is distributed to the terminal device 12. The user of the user ID "1001" can view the content included in the first content packet CP1 distributed to the terminal device 11. The user of the user ID "1002" can view the content included in the copied first content packet CP1 distributed to the terminal device 12.

Next, a description will be given of the operation of each element included in the packet distribution system S in order of the content server 300, the second gateway 200, the control server 400, and the first gateway 100, with reference to FIGS. 10 to 13.

Figure 10:
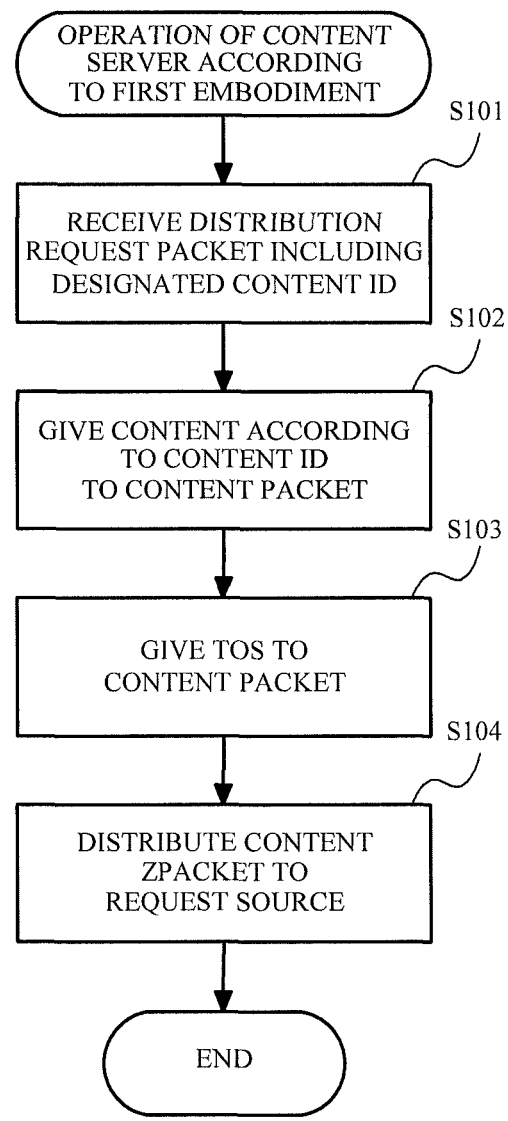
FIG. 10 is a flowchart illustrating processing steps performed by the content server according to the first embodiment.

FIG. 10 is a flowchart illustrating processing steps performed by the content server 300 according to the first embodiment. First, the content distribution unit 320 receives the distribution request packet including a designated content ID (step S101). The distribution request packet is transmitted from the terminal device 11 or 12. Next, the content distribution unit 320 gives the content according to the content ID to the content packet (step S102). More specifically, the content distribution unit 320 searches the content from the content table storage unit 310 based on the content ID included in the distribution request packet, extracts the content according to the designated content ID, and gives the extracted content and the content ID to the content packet. Next, the identification information giving unit 330 gives the TOS to the content packet (step S103). Next, the content distribution unit 320 distributes the content packet to a request source (step S104). More specifically, the content distribution unit 320 gives the destination IP address and a transmission source IP address to the content packet. When the request source of the distribution request packet is the terminal device 11, the content distribution unit 320 distributes the content packet to the terminal device 11. When the request source of the distribution request packet is the terminal device 12, the content distribution unit 320 distributes the content packet to the terminal device 12. Thereby, the content to which the destination IP address, the transmission source IP address, the TOS, the content ID and the content are given is distributed.

Figures 11A, 11B:
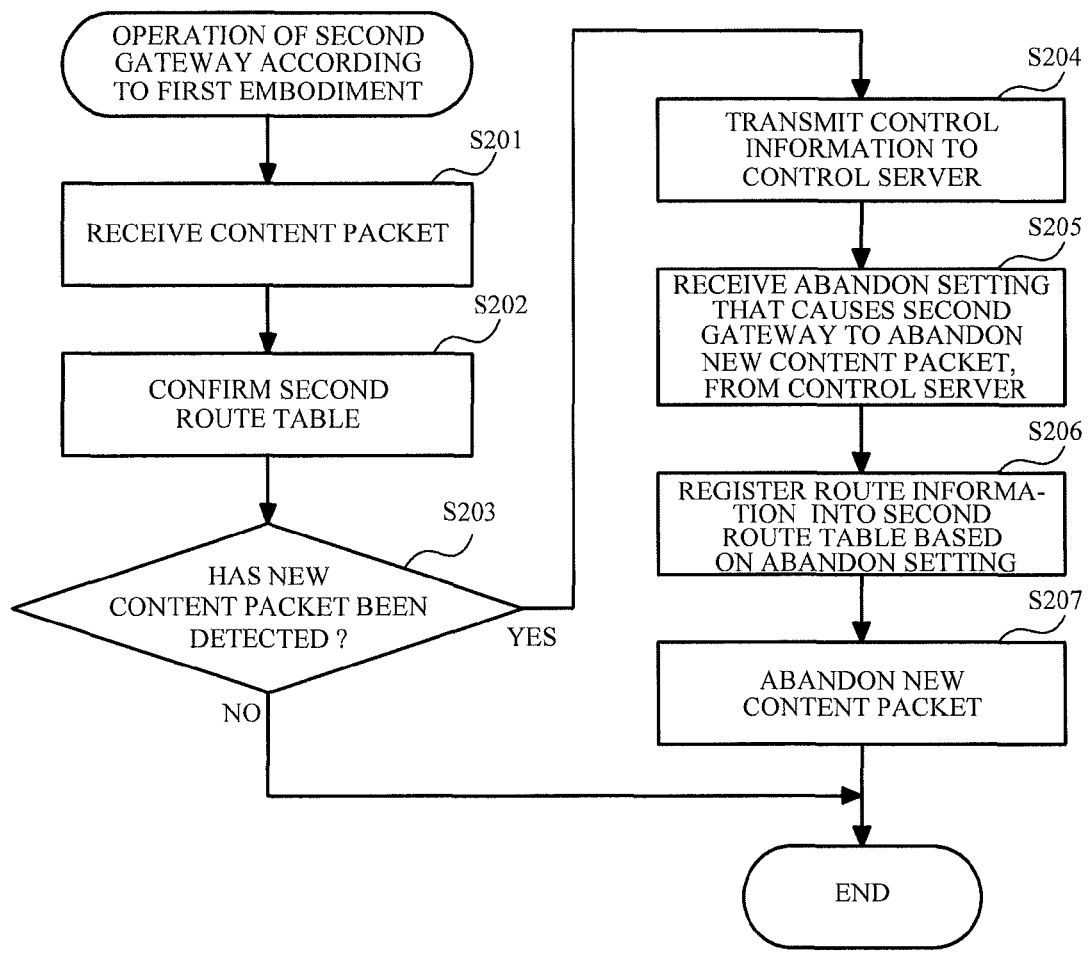
FIG. 11A is a flowchart illustrating processing steps performed by the second gateway according to the first embodiment.
FIG. 11B is a diagram illustrating an example of the second route table.

FIG. 11A is a flowchart illustrating processing steps performed by the second gateway 200 according to the first embodiment. More specifically, FIG. 11A is a flowchart illustrating processing steps performed when the terminal device 12 transmits the distribution packet RP2 to the content server 300 and the second content packet CP2 is distributed from the content server 300 in a state where the first content packet CP1 is distributed to the terminal device 11, as mentioned with reference to FIG. 9. FIG. 11B is a diagram illustrating an example of the second route table.

First, the content packet detection unit 230 receives the content packet distributed from the content server 300 (step S201). Next, the content packet detection unit 230 confirms the second route table (step S202), and determines whether a new content packet has been detected (step S203). The determination process is performed by whether a pair of the TOS, the destination IP address, and the content ID is registered into the second route table. When the pair of the TOS, the destination IP address, and the content ID is not registered into the second route table, the content packet detection unit 230 determines that the new content packet has been detected (YES in step S203). On the contrary, when the pair of the TOS, the destination IP address, and the content ID is registered into the second route table, the content packet detection unit 230 determines that the new content packet has not been detected (NO in step S203). In this case, the packet transfer unit 220 performs a process according to a transmission mode to the received content packet.

When the content packet detection unit 230 determines that the new content packet has been detected, the content packet detection unit 230 transmits the control information to the control server 400 (step S204). In addition, the content packet detection unit 230 transmits the new content packet to the packet transfer unit 220. Thereby, the pair of the TOS, the destination IP address, and the content ID is transmitted to the control server 400. Next, the route management unit 240 receives the abandon setting that causes the second gateway 200 to abandon the new content packet, from the control server 400 (step S205). When the route management unit 240 receives the abandon setting, the route management unit 240 registers the route information into the second route table based on the abandon setting (step S206). Thereby, the route information for abandoning the content packet including the TOS "10", the destination IP address "2.2.2.2" and the content ID "100" is registered into the second route table, as illustrated in FIG. 11B, for example.

The packet transfer unit 220 receives the new content packet from the content packet detection unit 230. The packet transfer unit 220 confirms the transfer mode of the second route table, and decides a process to the received new content packet. When the TOS "10", the destination IP address "2.2.2.2" and the content ID "100" are included in the new content packet, the packet transfer unit 220 abandons the new content packet according to the route information registered into the second route table (step S207). Thereby, the second content packet CP2 corresponding to the new content packet is abandoned by the second gateway 200, as illustrated in FIG. 9.

Figures 12A, 12B:
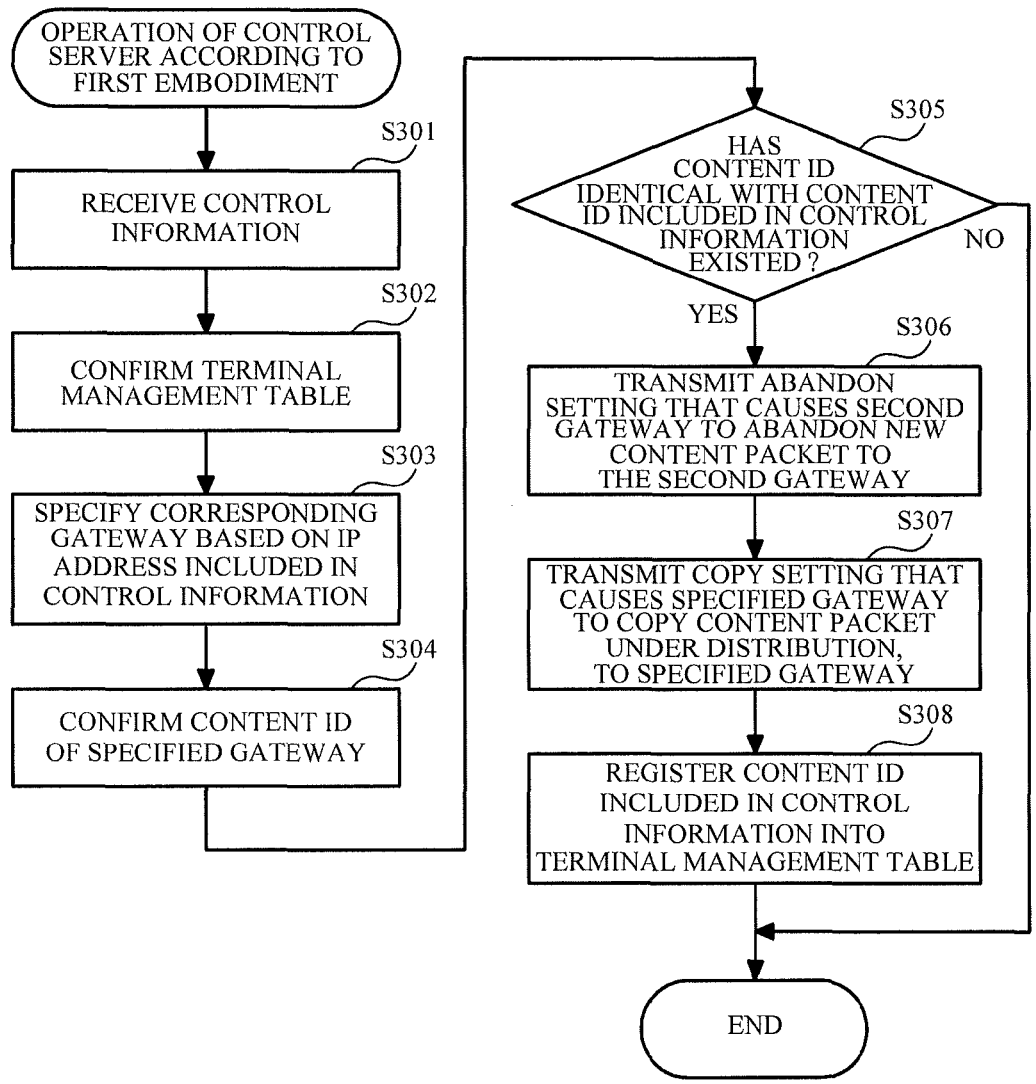
FIG. 12A is a flowchart illustrating processing steps performed by the control server according to the first embodiment.
FIG. 12B is a diagram illustrating an example of the terminal management table.

FIG. 12A is a flowchart illustrating processing steps performed by the control server 400 according to the first embodiment. More specifically, FIG. 12A is a flowchart illustrating processing steps performed when the control information is transmitted from the second gateway 200, as explained with reference to FIG. 11A. FIG. 12B is a diagram illustrating an example of the terminal management table.

First, the abandon control unit 421 receives the control information from the second gateway (step S301). Next, the abandon control unit 421 confirms the terminal management table (step S302). Next, the abandon control unit 421 specifies a corresponding gateway based on the IP address included in the control information (step S303). For example, when the control information includes the IP address "2.2.2.2", the gateway ID "GW1" is specified in FIG. 12B. Next, the abandon control unit 421 confirms the content ID of the specified gateway (step S304). In FIG. 12B, two terminal management information having the gateway ID "GW1" are registered into the terminal management table. Since the content of the content ID "100" is not still distributed to the terminal IP address "2.2.2.2", the service durative content ID is not registered (more specifically, see FIG. 6B). On the other hand, since the content of the content ID "100" is already distributed to the terminal IP address "1.1.1.1", the content ID "100" is registered into the service durative content ID. Therefore, the content ID "100" of the gateway ID "GW1" is confirmed.

Next, the abandon control unit 421 determines whether a content ID identical with the content ID included in the control information has existed (step S305). When the content ID "100" is included in the control information, for example, the content ID is the same as the confirmed content ID "100", and hence it is determined that the same content ID has existed. When the abandon control unit 421 determines that the content ID identical with the content ID included in the control information has existed (YES in step S305), the abandon control unit 421 transmits the abandon setting that causes the second gateway 200 to abandon the new content packet to the second gateway 200 (step S306). The copy control unit 422 transmits the copy setting that causes the specified gateway to copy the content packet under distribution, to the specified gateway based on the transmission of the abandon setting by the abandon control unit 421 (step S307). At this time, the copy control unit 422 includes a transfer destination IP address which is a transfer destination of the content packet to be copied, into the copy setting. Thereby, the copy setting including the transfer destination IP address is transmitted to the first gateway 100, for example. Here, the order of steps S306 and 5307 may be reversed. Next, the abandon control unit 421 registers the content ID included in the control information into the terminal management table (step S308). The registration is performed to the service durative content ID of the terminal IP address corresponding to the destination IP address included in the control information. Therefore, the content ID "100" is registered into the service durative content ID of the terminal management information having the terminal IP address "2.2.2.2", as illustrated in FIG. 12B. Thereby, the control server 400 can manage that content of the content ID "100" is distributed to the terminal device 12 having the terminal IP address "12.2.2".

Figures 13A, 13B:
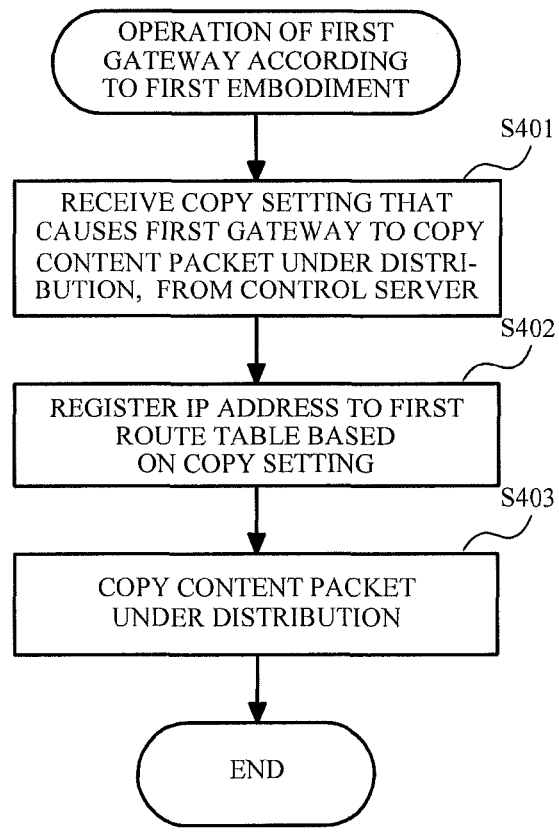
FIG. 13A is a flowchart illustrating processing steps performed by the first gateway according to the first embodiment.
FIG. 13B is a diagram illustrating an example of the first route table.

FIG. 13A is a flowchart illustrating processing steps performed by the first gateway 100 according to the first embodiment. More specifically, FIG. 13A is a flowchart illustrating processing steps performed when the copy setting is transmitted from the control server 400, as explained with reference to FIG. 12A. FIG. 13B is a diagram illustrating an example of the first route table.

First, the route management unit 130 receives the copy setting that causes the first gateway 100 to copy the content packet under distribution, from the control server 400 (step S401). Next, the route management unit 130 registers the IP address to the first route table based on the copy setting (step S402). As described above, the transfer destination IP address is included in the copy setting. Therefore, when the transfer destination IP address "2.2.2.2" is included in the copy setting, the transfer destination IP address "2.2.2.2" is registered into the branch destination IP address 2, as illustrated in FIG. 13B. Next, the packet transfer unit 120 copies the content packet under distribution (step S403). More specifically, the packet transfer unit 120 confirms the first route table, and determines whether to copy the content packet under distribution. When at least two IP addresses are registered into the branch destination IP addresses 1 to n of the first route table, the packet transfer unit 120 determines to copy the content packet under distribution. On the contrary, when an IP address is not registered into any one of the branch destination IP addresses 1 to n, the packet transfer unit 120 does not copy the content packet under distribution. In FIG. 13B, the IP address "1.1.1.1" is registered into the branch destination IP address 1. The IP address "2.2.2.2" is registered into the branch destination IP address 2. Therefore, the packet transfer unit 120 copies the content packet under distribution. The packet transfer unit 120 rewrites the destination IP address of the copied content packet by an IP address registered into the branch destination IP address 2. The packet transfer unit 120 continuously transfers the content packet under distribution to the IP address "1.1.1.1". The packet transfer unit 120 newly transfers the copied content packet to the IP address "2.2.2.2". Thereby, the content packets including the same contents are distributed to both of the terminal devices 11 and 12, as illustrated in FIG. 9.

As described above, in the first embodiment, when the content packet is distributed to one of the terminal devices 11 and 12, other one of the terminal devices 11 and 12 transmits the distribution request packet to the content server 300 and the new content packet is distributed from the content server 300, the new content packet is abandoned by the second gateway 200. Therefore, the new content packet having the same content does not flow into the core network CN, and hence the transfer load of the core network CN is reduced. That is, the aggravation of utilization efficiency of network facilities is improved. Moreover, since the content packet under distribution is copied by the first gateway 100 and the copied content packet under distribution is distributed to other one of the terminal devices 11 and 12, the user can view a content identical with the content included in the content packet under distribution.

(Second Embodiment) Next, a description will be given of a second embodiment with reference to FIGS. 14 to 19B. The second embodiment indicates processing performed when a stop request packet that stops the distribution of the content from any one of the terminal devices 11 and 12 to which the copied content packet is distributed is transmitted, in a state where the content packet is distributed to both of the terminal devices 11 and 12 as explained with reference to FIG. 9. First, a description will be given of the whole operation of the packet distribution system S with reference to FIG. 14, and then a description will be given of the operation of each element included in the packet distribution system S with reference to FIGS. 15 to 19B.

Figure 14:
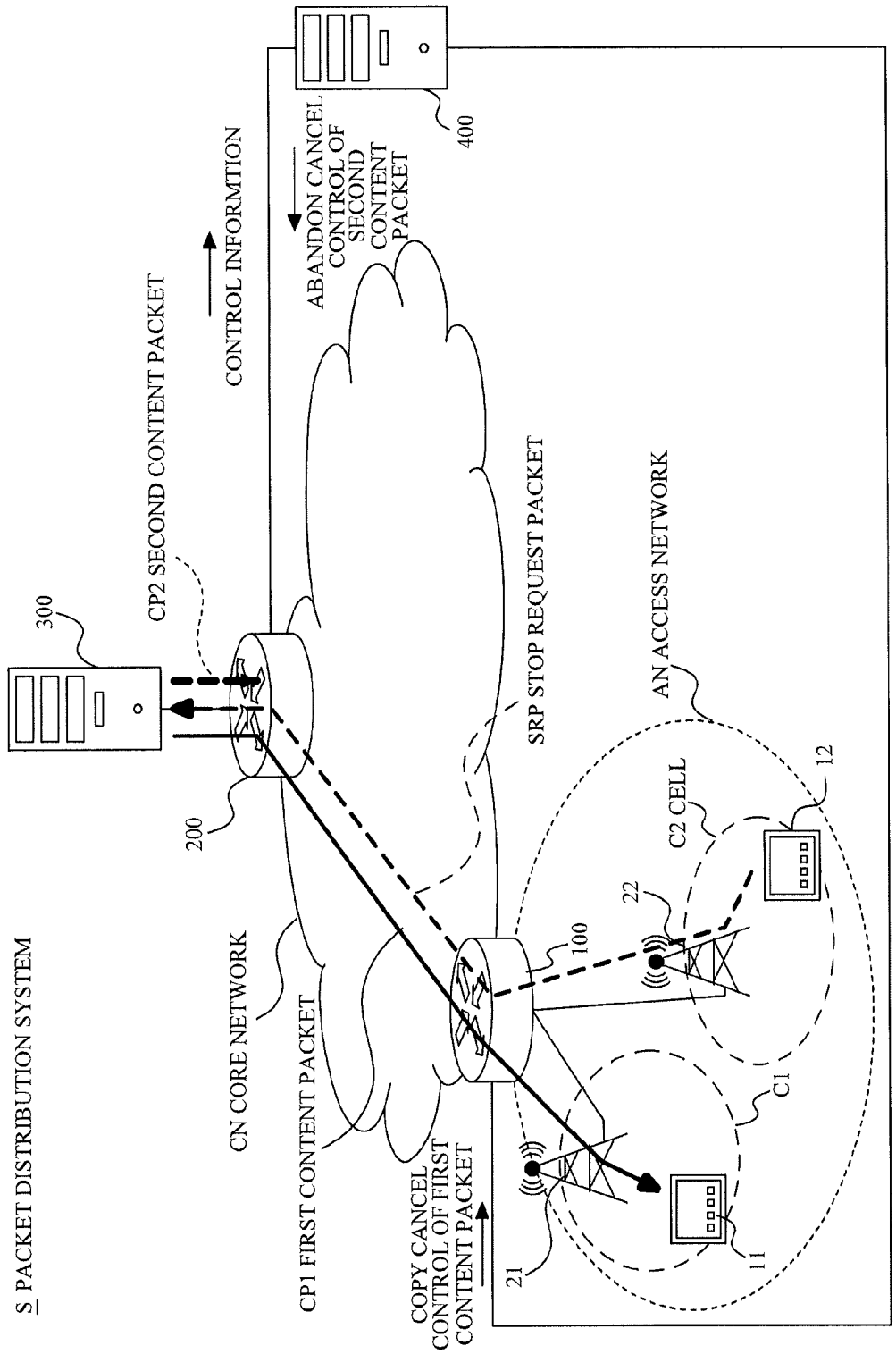
FIG. 14 is a diagram illustrating an example of the operation of the packet distribution system according to a second embodiment.

FIG. 14 is a diagram illustrating an example of the operation of the packet distribution system S according to the second embodiment.

When the terminal device 12 having the terminal IP address "2.2.2.2" transmits a stop request packet SRP to the content server 300, as illustrated in FIG. 14, the content server 300 distributes the second content packet CP2 including distribution stop information to the terminal device 12 based on the stop request packet SRP. After the distribution, the content server 300 stops the distribution of the second content packet CP2.

When the second gateway 200 receives the second content packet CP2, the second gateway 200 detects the distribution stop information included in the second content packet CP2 and transmits the control information to the control server 400.

The control server 400 compares the destination IP address "2.2.2.2" included in the control information with the terminal management table, and specifies the first gateway 100 corresponding to the destination IP address "2.2.2.2". The control server 400 transmits an abandon cancel setting that causes the second gateway 200 to cancel the abandon of the second content packet CP2 to the second gateway 200, and transmits a copy cancel setting that causes the first gateway 100 to cancel the copying of the first content packet CP1 to the first gateway 100.

The second gateway 200 updates the second route table based on the received abandon cancel setting. Thereby, the route information corresponding to the transmitted control information is deleted from the second route table. It is canceled that the route information corresponding to the transmitted control information remains although the content server 300 has already stopped the distribution. The first gateway 100 updates the first route table based on the received copy cancel setting. Thereby, the copying of the first content packet CP1 by the first gateway 100 is canceled. Therefore, the distribution of the copied first content packet CPI to the terminal device 12 is canceled, as illustrated in FIG. 14.

Next, a description will be given of the operation of each element included in the packet distribution system S in order of the content server 300, the second gateway 200, the control server 400, and the first gateway 100, with reference to FIGS. 15 to 19B.

Figure 15:
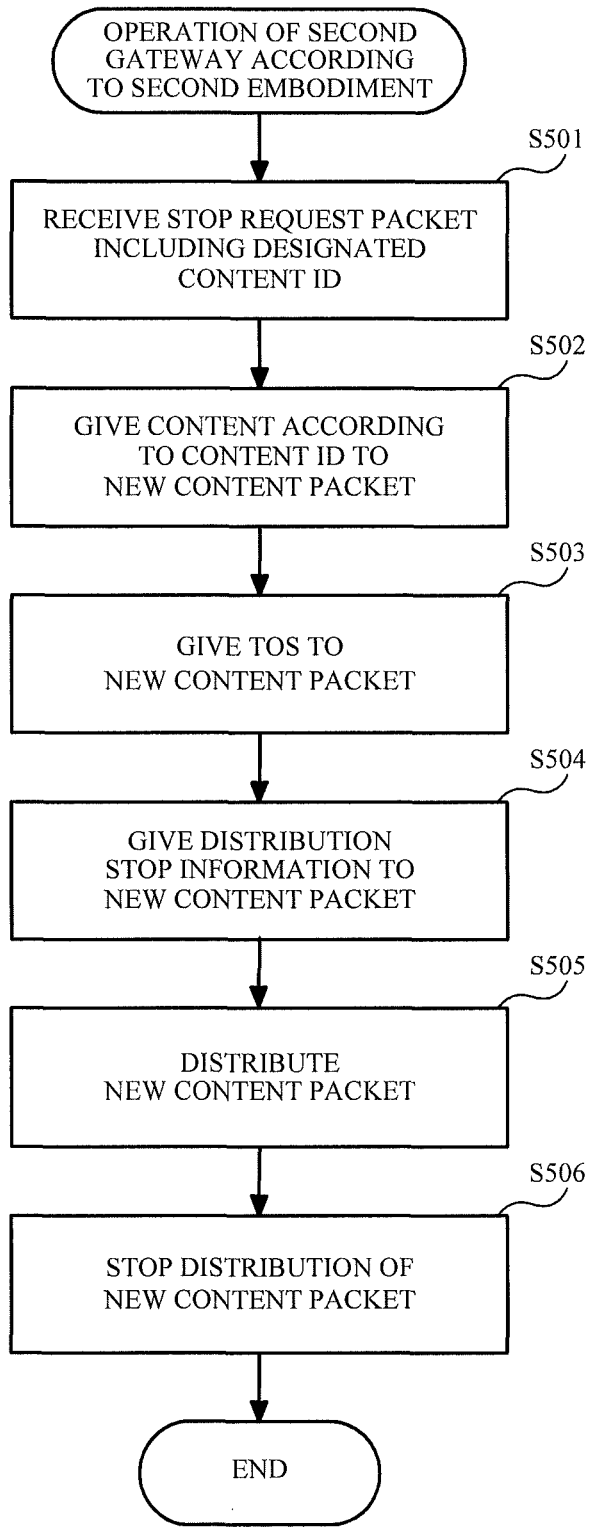
FIG. 15 is a flowchart illustrating processing steps performed by the content server according to the second embodiment.
Figures 16A, 16B:
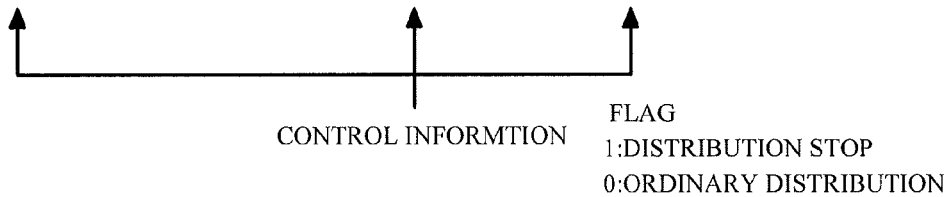
FIG. 16A is a diagram illustrating another example of the format of the distribution request packet.
FIG. 16B is a diagram illustrating another example of the format of the content packet.

FIG. 15 is a flowchart illustrating processing steps performed by the content server 300 according to the second embodiment. FIG. 16A is a diagram illustrating another example of the format of the distribution request packet. FIG. 16B is a diagram illustrating another example of the format of the content packet. First, the content distribution unit 320 receives the stop request packet including the designated content ID (step S501). In the second embodiment, the stop request packet is transmitted from the terminal device 12 to which the copied content packet is distributed. The stop request packet includes a distribution stop request in addition to the destination IP address, the transmission source IP address and the content ID, as illustrated in FIG. 16A. The distribution stop request is given to the stop request packet when the stop of the distribution is requested by the operation of the terminal device 12.

Next, the content distribution unit 320 gives the content according to the content ID, to the new content packet (step S502). Next, the identification information giving unit 330 gives the TOS to the new content packet (step S503). Steps S502 and 503 are the same as steps S102 and S103 described above. Next, the identification information giving unit 330 gives the distribution stop information to the new content packet (step S504). Specifically, a flag area for giving a flag to the content packet is provided in the content packet, as illustrated in FIG. 16B. For example, a numerical value "0" or "1" is given to the flag area as the flag. The numerical value "1" indicates the distribution stop information. The numerical value "0" does not indicate the distribution stop information, but indicate ordinary distribution. Therefore, the content distribution unit 320 gives the flag "1" to the new content packet. Thus, since the distribution stop is not identified from the distribution by the numerical value of the TOS but the distribution stop is identified from the distribution by the flag, the number of types of the distribution which can be expressed by the TOS can be increased.

Next, the content distribution unit 320 distributes the new content packet (step S505). Step S505 is basically the same as step S104 described above. Next, the content distribution unit 320 stops the distribution of the new content packet (step S506).

Figures 17A, 17B:
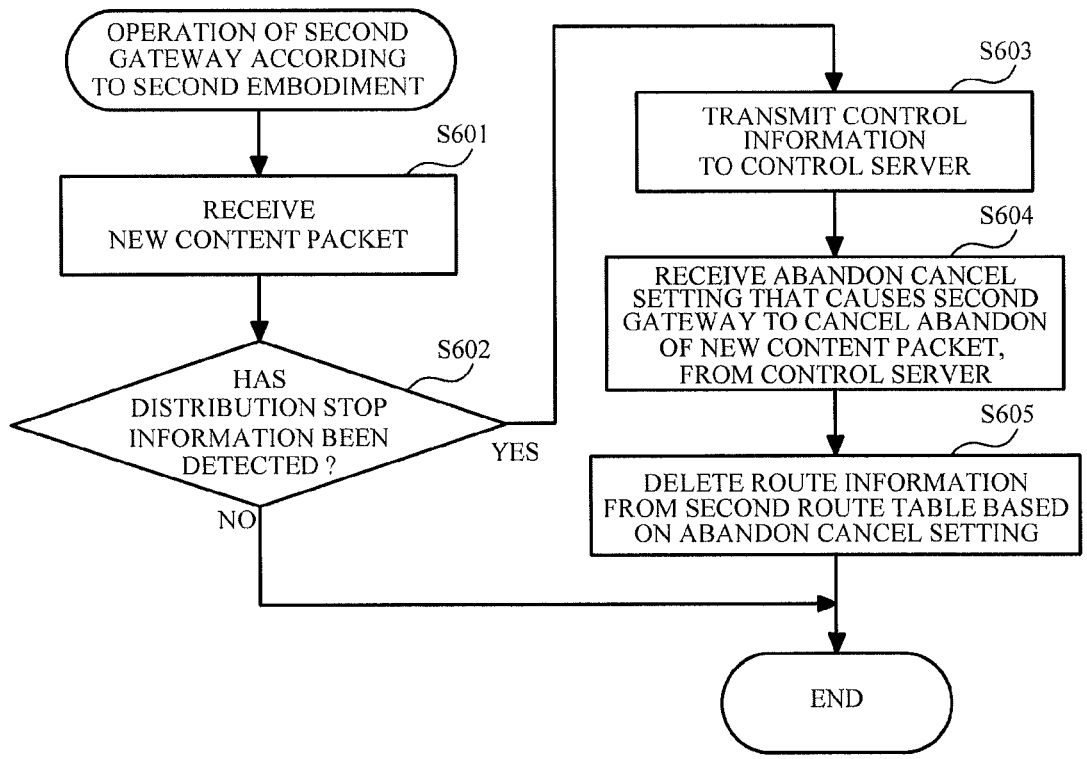
FIG. 17A is a flowchart illustrating processing steps performed by the second gateway according to the second embodiment.
FIG. 17B is a diagram illustrating an example of the second route table.

FIG. 17A is a flowchart illustrating processing steps performed by the second gateway 200 according to the second embodiment. FIG. 17B is a diagram illustrating an example of the second route table.

First, the content packet detection unit 230 receives the new content packet distributed from the content server 300 (step S601). Next, the content packet detection unit 230 determines whether the distribution stop information has been detected (step S602). When the flag "1" is included in the new content packet, for example, it is determined that the distribution stop information has been detected. When the flag "0" is included in the new content packet, it is determined that the distribution stop information has not been detected. When it is determined that the distribution stop information has been detected (YES in step S602), the content packet detection unit 230 transmits the control information to the control server 400 (step S603). Thereby, a pair of the TOS, the destination IP address and the content ID is transmitted to the control server 400.

Next, the route management unit 240 receives the abandon cancel setting that causes the second gateway 200 to cancel the abandon of the new content packet, from the control server 400 (step S604). When the route management unit 240 receives the abandon cancel setting, the route management unit 240 deletes the route information from the second route table based on the abandon cancel setting (step S605). Thereby, the route information including the TOS "10", the destination IP address "2.2.2.2", the content ID "100" and the transfer mode "abandon" (see FIG. 11B) is deleted from the second route table, as illustrated in FIG. 17B. Here, in addition to transmission of the control information mentioned above, the content packet detection unit 230 transmits the new content packet to the packet transfer unit 220. Before the route information is deleted, the new content packet is abandoned by the packet transfer unit 220.

FIG. 18A is a flowchart illustrating processing steps performed by the control server 400 according to the second embodiment. FIG. 18B is a diagram illustrating an example of the terminal management table.

First, the abandon control unit 421 receives the control information from the second gateway 200 (step S701). Next, the abandon control unit 421 confirms the terminal management table (step S702). Next, the abandon control unit 421 specifies a corresponding gateway based on the IP address included in the control information (step S703). When the control information includes the IP address "2.2.2.2", for example, the gateway ID "GW1" is specified in FIG. 18B.

Next, the abandon control unit 421 transmits the abandon cancel setting that causes the second gateway 200 to cancel the abandon of the new content packet to the second gateway 200 (step S704). When the control information includes the destination IP address "2.2.2.2", for example, the abandon cancel setting that causes the second gateway 200 to cancel the abandon of the content packet including the destination IP address "2.2.2.2" is transmitted to the second gateway 200. The copy control unit 422 transmits the copy cancel setting that causes the specified gateway to cancel the copying of the content packet under distribution to the specified gateway based on the transmission of the abandon cancel setting by the abandon control unit 421 (step S705). At this time, the copy control unit 422 includes the destination IP address included in the control information into the copy cancel setting. Thereby, the copy cancel setting including the destination IP address is transmitted to the first gateway 100, for example. Here, the order of steps S704 and S705 may be reversed. Next, the abandon control unit 421 deletes the content ID included in the control information from the terminal management table (step S706). The deletion is performed to the service durative content ID of the terminal IP address corresponding to the destination IP address included in the control information. Therefore, the content ID "100" is deleted from the service durative content ID of the terminal management information having the terminal IP address "2.2.2.2", as illustrated in FIG. 18B. Thereby, the control server 400 can manage that the content of the content ID "100" is not distributed to the terminal device 12 having the terminal IP address "2.2.2.2".

Figures 19A, 19B:
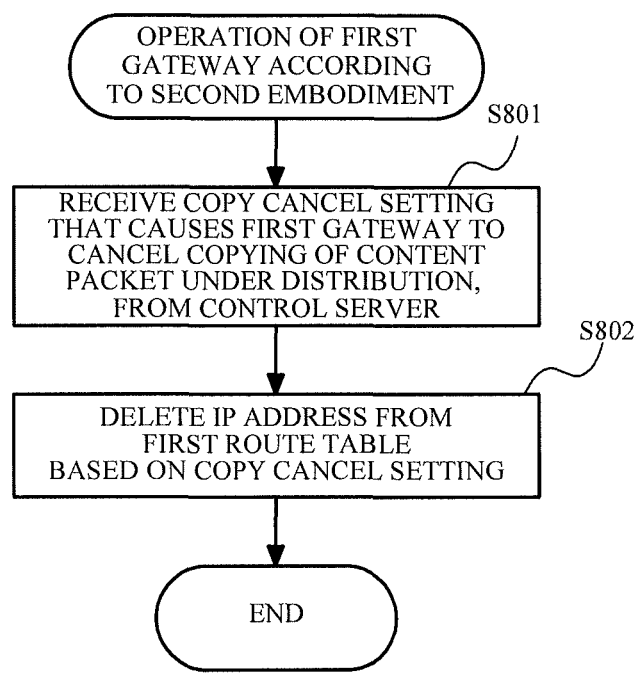
FIG. 19A is a flowchart illustrating processing steps performed by the first gateway according to the second embodiment.
FIG. 19B is a diagram illustrating an example of the first route table.

FIG. 19A is a flowchart illustrating processing steps performed by the first gateway 100 according to the second embodiment. FIG. 19B is a diagram illustrating an example of the first route table.

The route management unit 130 receives the copy cancel setting that causes the first gateway 100 to cancel the copying of the content packet under distribution, from the control server 400 (step S801). Next, the route management unit 130 deletes the IP address from the first route table based on the copy cancel setting (step S802). As described above, the destination IP address is included in the copy cancel setting. Therefore, when the destination IP address "2.2.2.2" is included in the copy cancel setting, the transfer destination IP address "2.2.2.2" is deleted from the branch destination IP address 2, as illustrated in FIG. 19B. Thereby, the distribution of the content packet to the terminal device 12 is stopped, as illustrated in FIG. 14.

As described above, in the second embodiment, when the content packet is distributed to both of the terminal devices 11 and 12, the terminal device 12 transmits the stop request packet to the content server 300 and the new content packet including the distribution stop information is distributed from the content server 300, the content server 300 stops the distribution, and the second gateway 200 deletes the route information that abandons the new content packet. In addition, the first gateway cancels the copying of the content packet under distribution. Thus, the user of the terminal device 12 can stop the distribution of the copied content packet. On the other hand, the user of the terminal device 11 can continuously view the content included in the content packet under distribution without being affected by stopping of the distribution to the terminal device 12.

(Third Embodiment) Next, a description will be given of a third embodiment with reference to FIGS. 20 to 25B. The third embodiment indicates processing performed when a stop request packet that stops the distribution of the content from any one of the terminal devices 11 and 12 to which the content packet of a copy source is distributed is transmitted, in a state where the content packet is distributed to both of the terminal devices 11 and 12 as explained with reference to FIG. 9. First, a description will be given of the whole operation of the packet distribution system S with reference to FIG. 20, and then a description will be given of the operation of each element included in the packet distribution system S with reference to FIGS. 21 to 25B.

Figure 20:
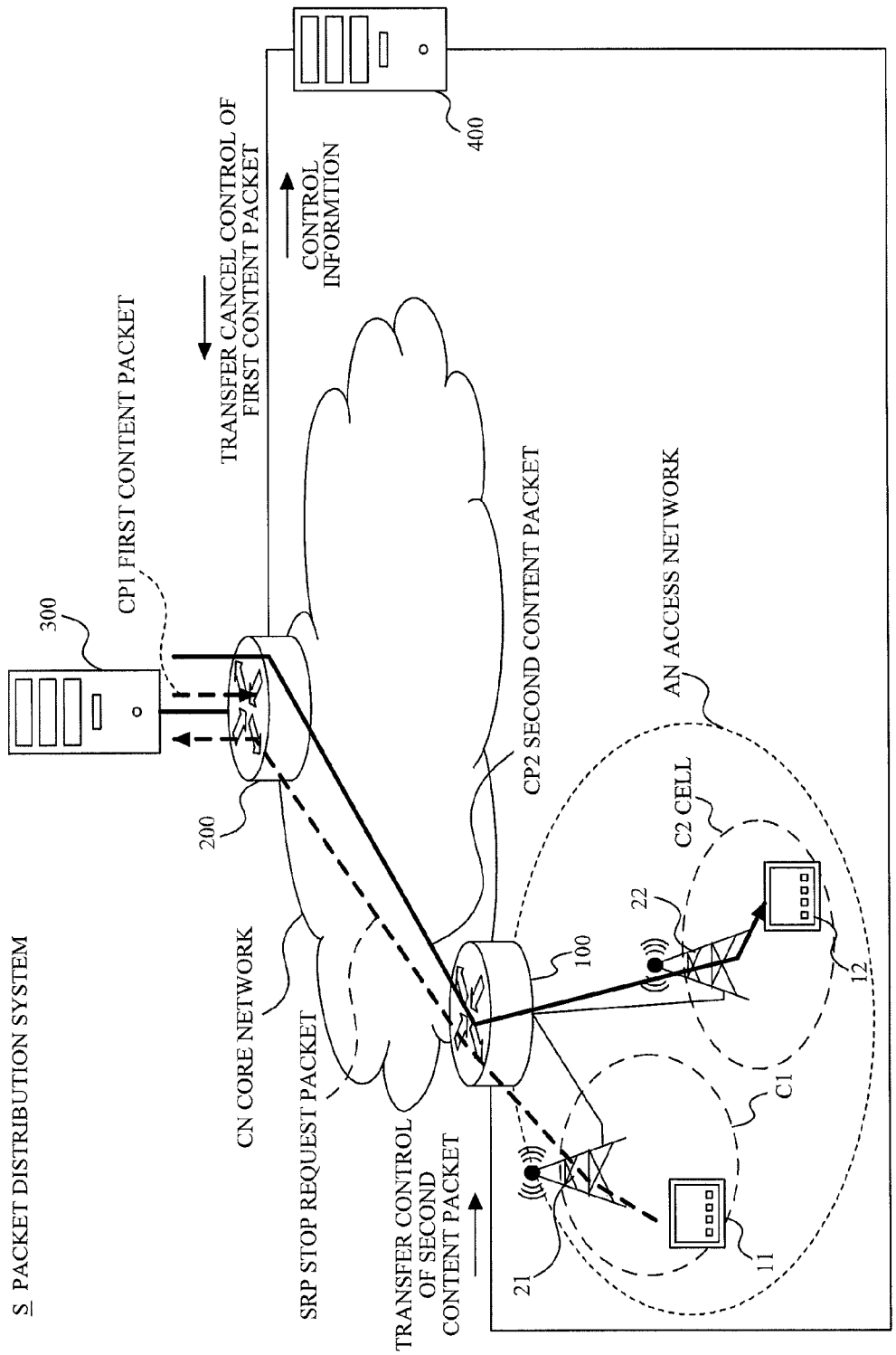
FIG. 20 is a diagram illustrating an example of the operation of the packet distribution system according to a third embodiment.

FIG. 20 is a diagram illustrating an example of the operation of the packet distribution system according to the third embodiment.

When the terminal device 11 having the terminal IP address "1.1.1.1" transmits the stop request packet SRP to the content server 300 as illustrated in FIG. 20, the content server 300 distributes the first content packet CP1 including the distribution stop information to the terminal device 11 based on the stop request packet SRP. After the distribution, the content server 300 stops the distribution of the first content packet CP1.

When the second gateway 200 receives the first content packet CPI, the second gateway 200 detects the distribution stop information included in the first content packet CP1, and transmits the control information to the control server 400.

The control server 400 compares the destination IP address "1.1.1.1" included in the control information with the terminal management table, and specifies the first gateway 100 corresponding to the destination IP address "1.1.1.1". The control server 400 transmits a transfer cancel setting that causes the second gateway 200 to cancel the transfer of the first content packet CPI to the second gateway 200. The control server 400 transmits the transfer setting that causes the first gateway 100 and the second gateway 200 to transfer the second content packet CP2 to the first gateway 100 and the second gateway 200.

The second gateway 200 updates the second route table based on the received transfer cancel setting and the received transfer setting. Thereby, the transfer of the first content packet CPI is canceled. Since the second content packet CP2 has the destination IP address "2.2.2.2", the second content packet CP2 is transferred to the terminal device 12. The first gateway 100 updates the first route table based on the received transfer setting. Thereby, the second content packet CP2 is transferred to the terminal device 12 by the first gateway 100. That is, the second content packet CP2 is transferred to the terminal device 12, as illustrated in FIG. 20. Here, the first content packet CPI is already abandoned by the second gateway 200. Therefore, the first gateway 100 does not receive the first content packet CP1.

Next, a description will be given of the operation of each element included in the packet distribution system S in order of the content server 300, the second gateway 200, the control server 400, and the first gateway 100, with reference to FIGS. 21 to 25B.

Figure 21:
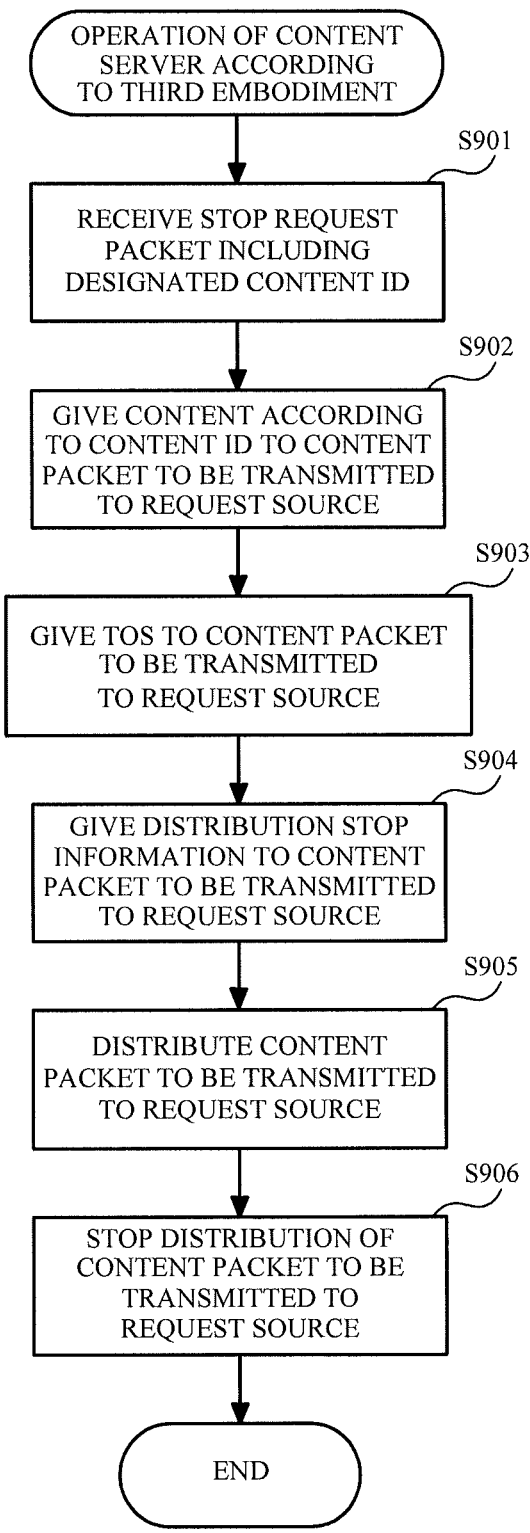
FIG. 21 is a flowchart illustrating processing steps performed by the content server according to the third embodiment.

FIG. 21 is a flowchart illustrating processing steps performed by the content server 300 according to the third embodiment. First, the content distribution unit 320 receives the stop request packet including the designated content ID (step S901). In the third embodiment, the stop request packet is transmitted from the terminal device 11 to which the content packet of the copy source is distributed. The stop request packet used in the third embodiment is the same as the stop request packet used in the second embodiment, as explained with reference to FIG. 16A.

The content distribution unit 320 gives the content according to the content ID to the content packet to be transmitted to the request source (step S902). Here, the request source is the terminal device 11 which has transmitted the stop request packet. Next, the identification information giving unit 330 gives the TOS to the content packet to be transmitted to the request source (step S903). Next, the identification information giving unit 330 gives the distribution stop information to the content packet to be transmitted to the request source (step S904). This is the same as the second embodiment explained with reference to FIG. 16B. Next, the content distribution unit 320 distributes the content packet to be transmitted to the request source (step S905). Next, the content distribution unit 320 stops the distribution of the content packet to be transmitted to the request source (step S906).

FIG. 22 is a diagram illustrating an example of the second route table according to the third embodiment. The second route table of the third embodiment is different from that of the first and the second embodiments in including a distribution destination IP address. An IP address of the terminal device to which the content packet is first distributed, among the plurality of terminal devices belonging to the same gateway, is registered into the distribution destination IP address. For example, in FIG. 22, the terminal device 11 of the IP address "1.1.1.1" and the terminal device 12 of the IP address "2.2.2.2" belong to the first gateway 100 (moreover, see FIGS. 1 and 6B). As explained in the first embodiment, first the content packet is distributed to the terminal device 11 of the IP address "1.1.1.1", and next the content packet is distributed to the terminal device 12 of the IP address "2.2.2.2". Therefore, the IP address "1.1.1.1" is registered into the distribution destination IP address. An advantage to make the distribution destination IP address newly is described later in detail.

Figure 23A:
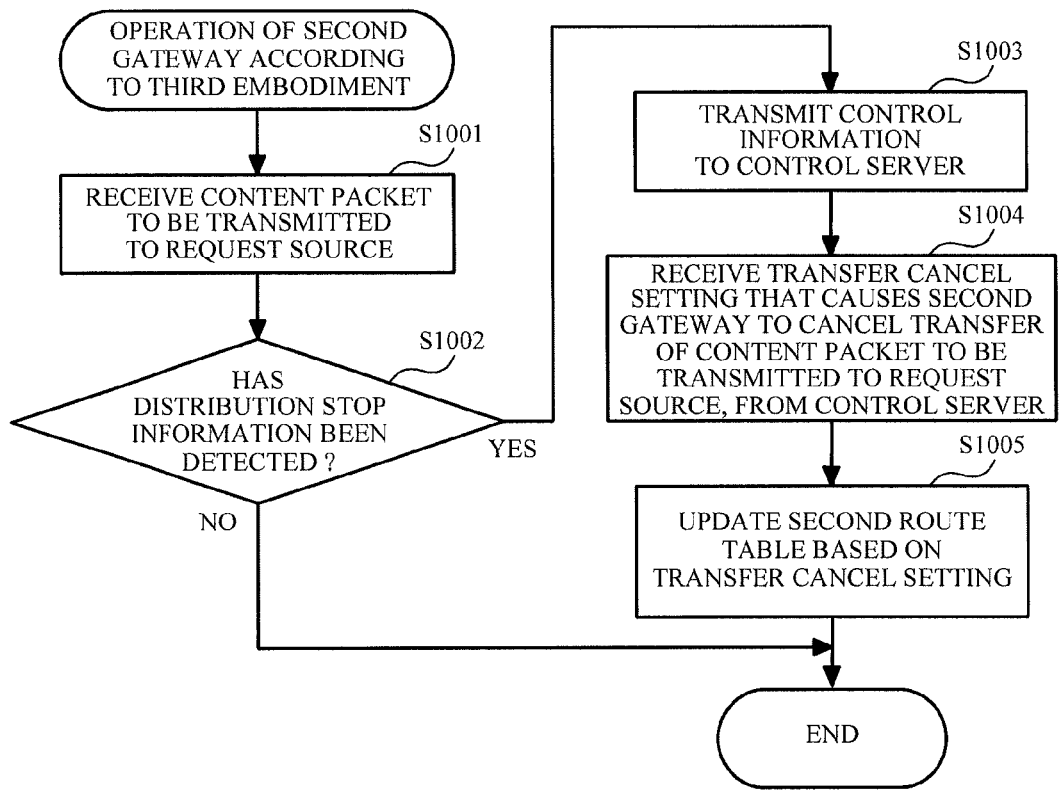
FIG. 23A is a flowchart illustrating processing steps performed by the second gateway according to the third embodiment.
Figure 23B:
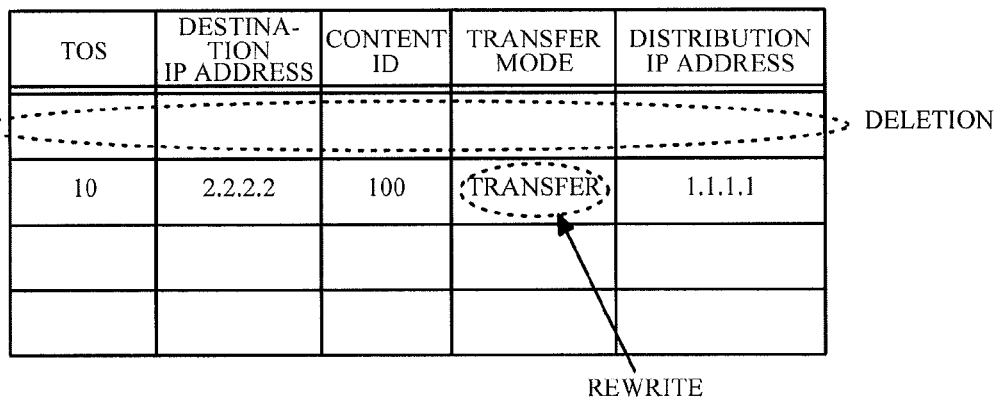
FIG. 23B is a diagram illustrating an example of the second route table.

FIG. 23A is a flowchart illustrating processing steps performed by the second gateway 200 according to the third embodiment. FIG. 23B is a diagram illustrating an example of the second route table.

First, the content packet detection unit 230 receives the content packet to be transmitted to the request source, distributed from the content server 300 (step S1001). Next, the content packet detection unit 230 determines whether the distribution stop information has been detected (step S1002). When the flag "1" is included in the content packet to be transmitted to the request source, for example, it is determined that the distribution stop information has been detected. When the flag "0" is included in the content packet to be transmitted to the request source, it is determined that the distribution stop information has not been detected. When it is determined that the distribution stop information has been detected (YES in step S1002), the content packet detection unit 230 transmits the control information to the control server 400 (step S1003). Thereby, the pair of the TOS, the destination IP address and the content ID is transmitted to the control server 400.

The route management unit 240 receives the transfer cancel setting that causes the second gateway 200 to cancel the transfer of the content packet to be transmitted to the request source, from the control server 400 (step S1004). The IP address of the request source is included in the transfer cancel setting. Since the request source is the terminal device 11 in the third embodiment, the destination IP address "1.1.1.1" is included in the transfer cancel setting. When the route management unit 240 receives the transfer cancel setting, the route management unit 240 updates the second route table based on the transfer cancel setting (step S1005).

Here, a description will be given of a concrete example of update processing by the route management unit 240, with reference to FIGS. 22 and 23B. First, the route management unit 240 compares the destination IP address (e.g. the destination IP address "1.1.1.1") included in the transfer cancel setting with the second route table. Next, the route management unit 240 specifies the route information having the identical destination IP address, as a deletion target. Thereby, in FIG. 22, the route information including the TOS "10", the destination IP address "1.1.1.1", the content ID "100" and the transfer mode "transfer" is specified as the deletion target. Next, the route management unit 240 confirms the distribution destination IP address included in the specified route information, and determines whether route information having the same distribution destination IP address exists in the second route table. In FIG. 22, the route information including the distribution destination IP address "1.1.1.1" and the destination IP address "2.2.2.2" exists, When the route information exists, the route management unit 240 rewrites the transfer mode of the route information as "transfer". Thereby, the transfer mode of the route information of the destination IP address "2.2.2.2" is rewritten from "abandon" to "transfer". Next, when the transfer mode of the specified route information is "transfer", the route management unit 240 deletes the route information, as illustrated in FIG. 23B.

Figures 24A, 24B:
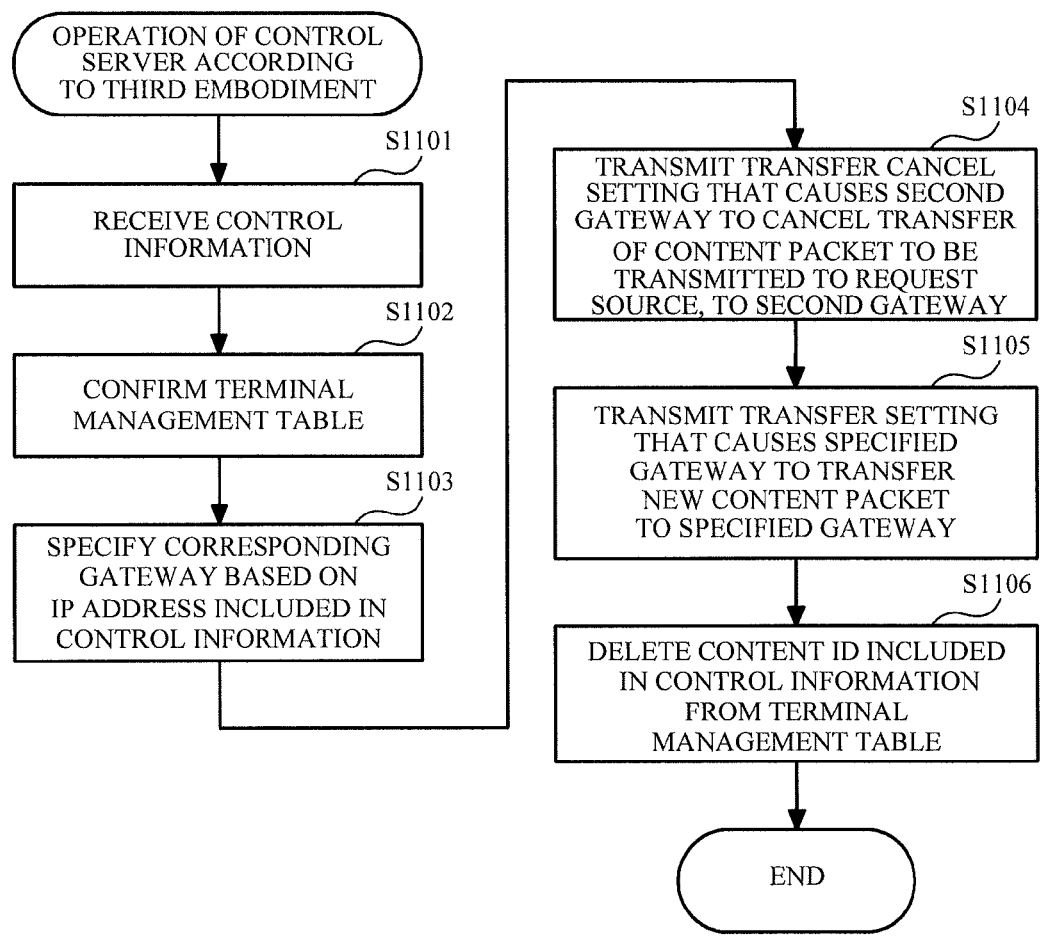
FIG. 24A is a flowchart illustrating processing steps performed by the control server according to the third embodiment.
FIG. 24B is a diagram illustrating an example of the terminal management table.

FIG. 24A is a flowchart illustrating processing steps performed by the control server 400 according to the third embodiment. FIG. 24B is a diagram illustrating an example of the terminal management table.

First, the abandon control unit 421 receives the control information from the second gateway 200 (step S1101). Next, the abandon control unit 421 confirms the terminal management table (step S1102). Next, the abandon control unit 421 specifies a corresponding gateway based on the IP address included in the control information (step S1103). For example, when the control information includes the IP address "1.1.1.1", the gateway ID "GW1" is specified in FIG. 24B.

Next, the abandon control unit 421 transmits the transfer cancel setting that causes the second gateway 200 to cancel the transfer of the content packet to be transmitted to the request source, to the second gateway 200 (step S1104). When the control information includes the destination IP address "1.1.1.1", the transfer cancel setting that causes the second gateway 200 to cancel the transfer of the content packet including the destination IP address "1.1.1.1" is transmitted to the second gateway 200. Next, the copy control unit 422 transmits the transfer setting that causes the specified gateway to transfer the new content packet to the specified gateway, based on the transmission of the transfer cancel setting by the abandon control unit 421 (step S1105). At this time, the copy control unit 422 includes the destination IP address included in the control information into the transfer setting. Thereby, the transfer setting including the destination IP address is transmitted to the first gateway 100, for example. Here, the order of steps S1104 and S1105 may be reversed. The abandon control unit 421 deletes the content ID included in the control information from the terminal management table (step S1106). The deletion is performed to the service durative content ID of the terminal IP address corresponding to the destination IP address included in the control information. Therefore, the content ID "100" is deleted from the service durative content ID of the terminal management information having the terminal IP address "1.1.1.1", as illustrated in FIG. 24B. Thereby, the control server 400 can manage that the content of the content ID "100" is not distributed to the terminal device 11 having the terminal IP address "1.1.1.1".

Figures 25A, 25B:
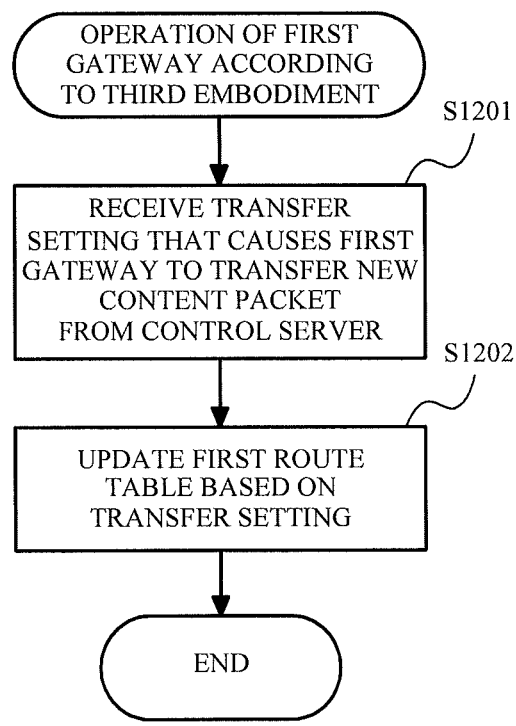
FIG. 25A is a flowchart illustrating processing steps performed by the first gateway according to the third embodiment.
FIG. 25B is a diagram illustrating an example of the first route table.

FIG. 25A is a flowchart illustrating processing steps performed by the first gateway 100 according to the third embodiment. FIG. 25B is a diagram illustrating an example of the first route table.

First, the route management unit 130 receives the transfer setting that causes the first gateway 100 to transfer the new content packet from the control server 400 (step S1201). Next, the route management unit 130 deletes the IP address from the first route table based on the transfer setting (step S1202). As described above, the destination IP address is included in the transfer setting. Therefore, when the destination IP address "1.1.1.1" is included in the transfer setting, the destination IP address "1.1.1.1" is deleted from the branch destination IP address 1, as illustrated in FIG. 25B. Thereby, the distribution of the content packet to the terminal device 12 is stopped, as illustrated in FIG. 20. Here, the first content packet CP1 of the copy source is not distributed from the content server 300. The IP address is deleted from the branch destination IP address 1, so that it is canceled that the IP address remains in the branch destination IP address 1 although the content server 300 has already stopped distribution.

As described above, the transfer mode of the route information having a distribution destination IP address identical with the distribution destination IP address included in the route information to be deleted is rewritten from "abandon" to "transfer", Thereby, even when there is a stop request of the content from the terminal device 11 to which the first content packet CPI of the copy source is distributed, in a state where the first content packet CP1 is distributed to both of the terminal devices 11 and 12, the second content packet CP2 including the content identical with the content included in the first content packet CP1 is distributed to the terminal device 12. Therefore, the user of the terminal device 12 can continuously view the content without being affected by the stop request.

(Fourth Embodiment) Next, a description will be given of a fourth embodiment with reference to FIGS. 26 to 36B. The fourth embodiment indicates processing performed when the content packet is distributed to both of the terminal devices 11 and 12 as explained with reference to FIG. 9, the content packet is also distributed to a terminal device 13 based on the distribution request from the terminal device 13, and the stop request packet that stops the distribution of the content is transmitted from any one of the terminal devices 11 and 12 to which the content packet of the copy source is distributed.

First, a description will be given of the operation until the content packet is distributed to the terminal device 13 based on the distribution request from the terminal device 13, among the whole operation of the packet distribution system S with reference to FIGS. 26 to 31B. Next, a description will be given of the operation in which the stop request packet that stops the distribution of the content is transmitted from any one of the terminal devices 11 and 12 to which the content packet of the copy source is distributed, among the whole operation of the packet distribution system S with reference to FIGS. 32 to 36B.

Figure 26:
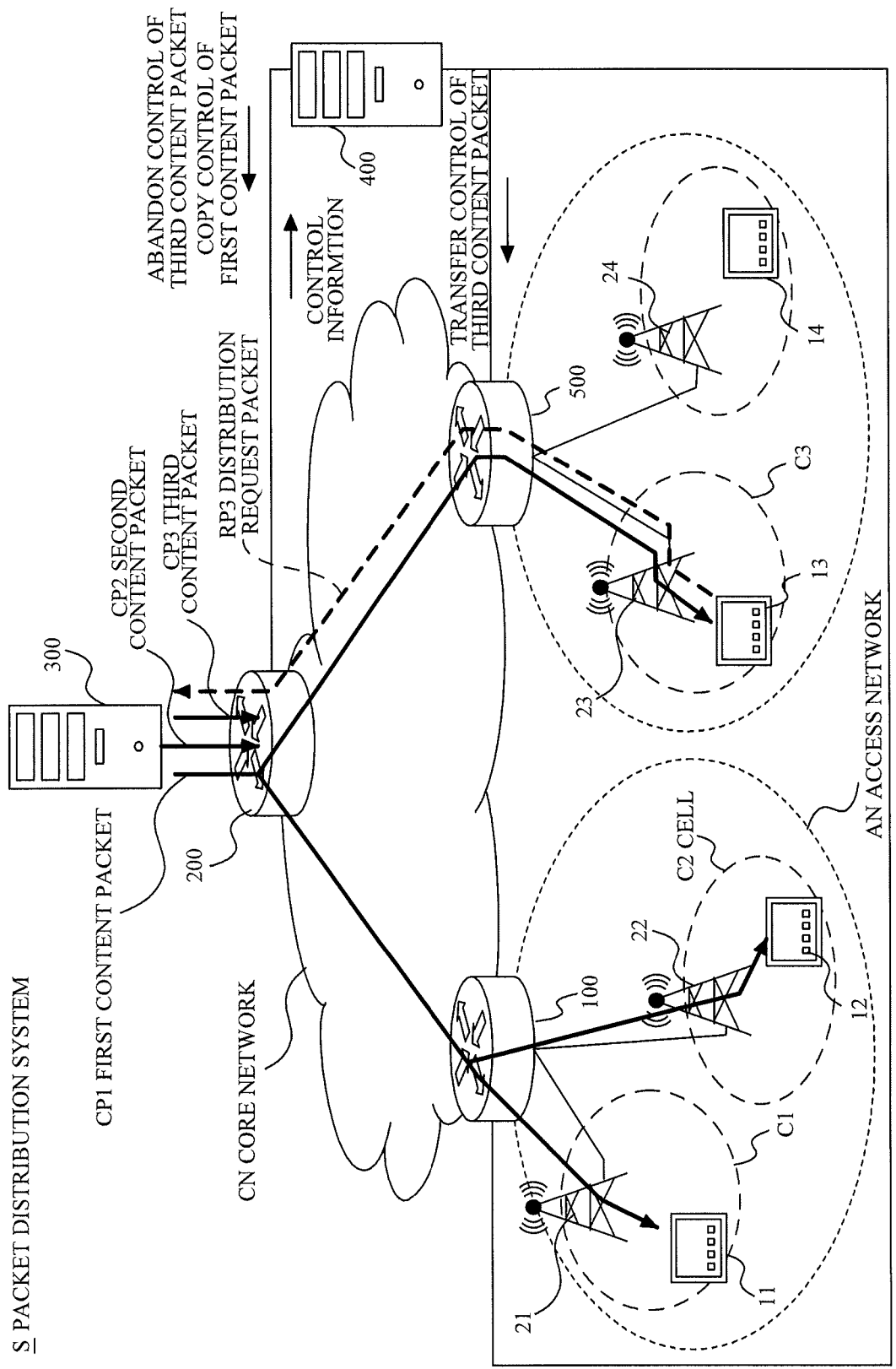
FIG. 26 is a diagram illustrating an example of the operation of the packet distribution system according to a fourth embodiment.

FIG. 26 is a diagram illustrating an example of the operation of the packet distribution system S according to the fourth embodiment.

First, the packet distribution system S of the fourth embodiment differs from that of the first to the third embodiments in having the third gateway 500. The third gateway 500 is placed near the terminal device 13 and on the boundary of the core network CN. The third gateway 500 transfers a distribution request packet RP3 received from a base station 23 to the second gateway 200. The third gateway 500 transfers the content packet transferred from the second gateway 200 to the base station 23.

When the terminal device 13 having a terminal IP address "3.3.3.3" transmits the distribution request packet RP3 to the content server 300 in a state where the first content packet CP1 is distributed to both of the terminal devices 11 and 12, as explained in the first embodiment, the content server 300 distributes a third content packet CP3 according to the distribution request packet RP3 to the terminal device 12.

When the second gateway 200 receives the third content packet CP3, the second gateway 200 compares the second route table with the control information included in the third content packet CP3, and determines whether a new content packet has been detected. When the control information is included in the second route table, the second gateway 200 determines that the new content packet has been detected, and transmits the control information to the control server 400.

The control server 400 compares the destination IP address included in the control information with the terminal management table, and specifies the gateway ID corresponding to the destination IP address. The control server 400 confirms the service durative content ID based on the specified gateway ID. When a content ID identical with the content ID included in the control information exists as the result of the confirmation of the service durative content ID, the control server 400 determines that the distribution is not first distribution, and transmits to the second gateway 200 the abandon setting that causes the second gateway 200 to abandon the third content packet CP3, and the copy setting that causes the second gateway 200 to copy the first content packet CP1. Moreover, the control server 400 transmits the transfer setting that causes a specified gateway (e.g. the third gateway 500) to transfer the third content packet CP3 to the specified gateway. After the transmission, the control server 400 registers the content ID included in the control information into the service durative content ID of the terminal management table.

The second gateway 200 updates the second route table based on the received abandon setting and the copy setting. Thereby, the third content packet CP3 is abandon by the second gateway 200, as illustrated in FIG. 26. The first content packet CPI is copied by the second gateway 200. At this time, the destination IP address of the copied first content packet CPI is rewritten into the IP address of the terminal device 13 based on the updated second route table. The third gateway 500 updates a third route table based on the received transfer setting. Thereby, the first content packet CP1 is copied by the second gateway 200, as illustrated in FIG. 26. Then, the first content packet CP1 copied by the second gateway 200 is distributed to the terminal device 13. A user of a user ID "1003" can view the content included in the copied first content packet CP1 distributed to the terminal device 13.

Next, a description will be given of the operation of each element included in the packet distribution system S in order of the content server 300, the second gateway 200, the control server 400, and the first gateway 100, with reference to FIGS. 27 to 31B.

Figure 27:
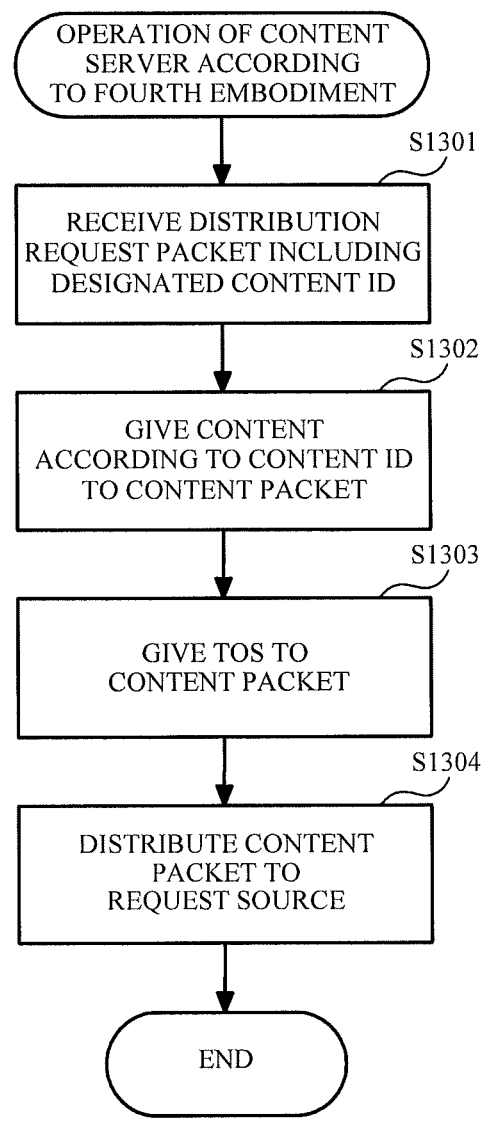
FIG. 27 is a flowchart illustrating processing steps performed by the content server according to the fourth embodiment.

FIG. 27 is a flowchart illustrating processing steps performed by the content server 300 according to the fourth embodiment. The flowchart illustrated in FIG. 27 is basically the same as the flowchart illustrated in FIG. 10. First, the content table storage unit 310 receives the distribution request packet including the designated content ID (step S1301). In the fourth embodiment, the distribution request packet is transmitted from the terminal device 13. Next, the content table storage unit 310 gives the content according to the content ID to the content packet (step S1302). Next, the identification information giving unit 330 gives the TOS to the content packet (step S1303). Next, the content table storage unit 310 distributes the content packet to the request source (step S1304). In the fourth embodiment, since the request source is the terminal device 13, the content table storage unit 310 distributes the content packet including the destination IP address "3.3.3.3" to the terminal device 13.

FIG. 28 is a diagram illustrating an example of the second route table according to the fourth embodiment. The second route table of the fourth embodiment differs from the second route table of the third embodiment in having a plurality of distribution destination IP addresses. Although two distribution destination IP addresses are illustrated in FIG. 28, there may be three or more distribution destination IP addresses. An IP address of the terminal device to which the content packet is first distributed, among the plurality of terminal devices belonging to the same gateway, is registered into the distribution destination IP address 1. When the distribution of the content having the content ID identical with an already registered content ID is requested from a terminal device belonging to a gateway different from another gateway to which another terminal device having an already registered distribution IP address belongs, the IP address included in the another terminal device is registered into the distribution destination IP address 2. Here, a concrete registration method of the distribution destination IP address 2 and an advantage in which the distribution destination IP address 2 is newly provided are described later in detail.

Figures 29A, 29B:
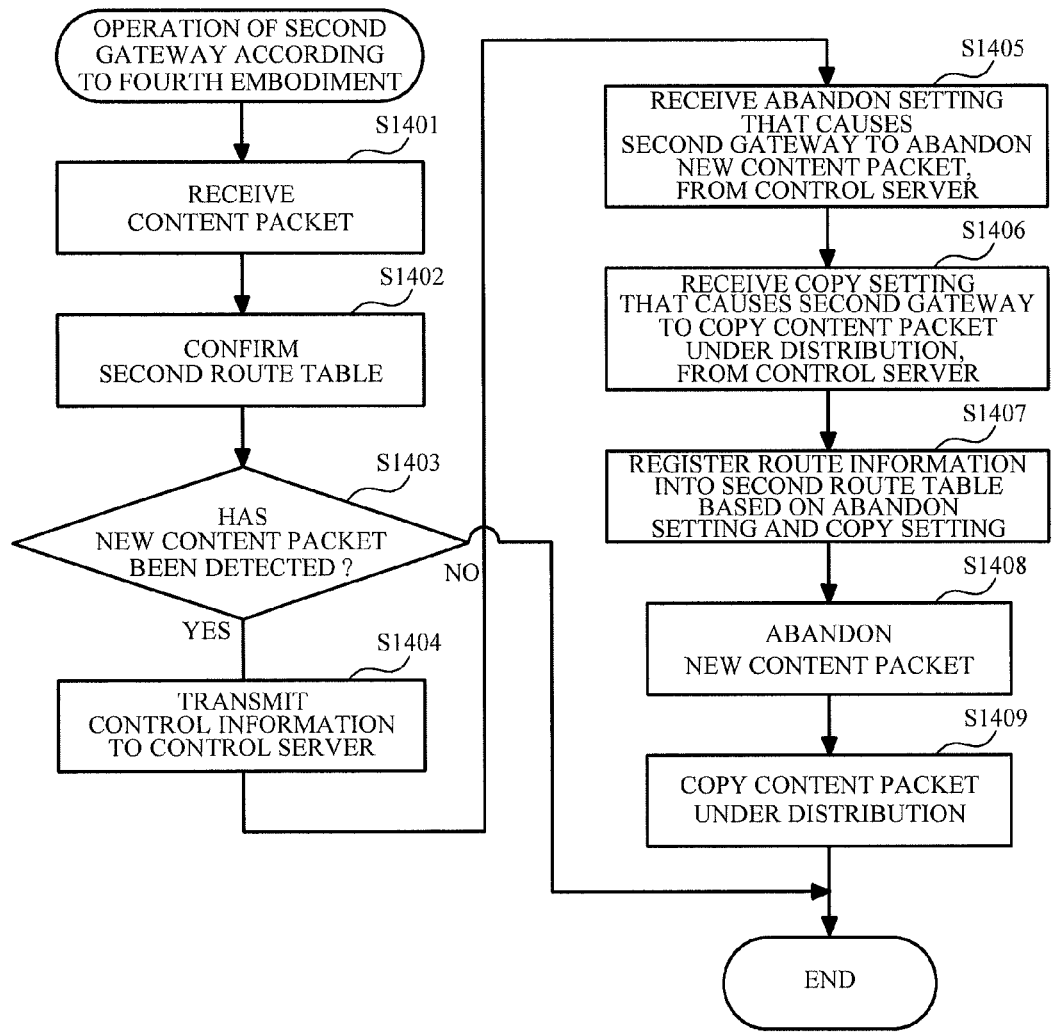
FIG. 29A is a flowchart illustrating processing steps performed by the second gateway according to the fourth embodiment.
FIG. 29B is a diagram illustrating an example of the second route table.

FIG. 29A is a flowchart illustrating processing steps performed by the second gateway 200 according to the fourth embodiment. FIG. 29B is a diagram illustrating an example of the second route table. Here, the flowchart illustrated in FIG. 29A is basically the same as the flowchart illustrated in FIG. 11A.

The content packet detection unit 230 receives the content packet distributed from the content server 300 (step S1401). Next, the content packet detection unit 230 confirms the second route table (step S1402), and detects whether a new content packet has been detected (step S1403). When it is determined that the new content packet has been detected, the content packet detection unit 230 transmits the control information to the control server 400 (step S1404). In addition, the content packet detection unit 230 transmits the new content packet to the packet transfer unit 220. Next, the route management unit 240 receives the abandon setting that causes the second gateway 200 to abandon the new content packet from the control server 400 (step S1405).

Next, the route management unit 240 receives the copy setting that causes the second gateway 200 to copy the content packet under distribution from the control server 400 (step S1406). When the route management unit 240 receives the abandon setting and the copy setting, the route management unit 240 registers the route information into the second route table based on based on the abandon setting and the copy setting (step S1407). When the abandon setting is received for example, the route information that abandons the content packet including the TOS "10", the destination IP address "3.3.3.3" and the content ID "100" is registered into the second route table, as illustrated in FIG. 29B. When the copy setting is received, the destination IP address 1 of new registered route information is registered into the destination IP address 2 of the route information in which the transfer mode is "transfer", among the route information having the TOS and the content ID which is the same as the TOS and the content ID of the new registered route information. Therefore, the IP address "3.3.3.3" registered into the destination IP address 1 is also registered into the destination IP address 2, based on the TOS, the content ID and the transfer mode.

The packet transfer unit 220 receives the new content packet from the content packet detection unit 230. That is, the third content packet CP3 is received. The packet transfer unit 220 confirms the transfer mode of the second route table, and decides processing to the received new content packet. When the TOS "10", the destination IP address "3.3.3.3" and the content ID "100" are included in the new content packet, the packet transfer unit 220 abandons the new content packet according to the route information registered into the second route table (step S1408). Thereby, the third content packet CP3 corresponding to the new content packet is abandoned by the second gateway 200, as illustrated in FIG. 26. Moreover, the TOS "10", the destination IP address "1.1.1.1" and the content ID "100" are included in the content packet under distribution, the packet transfer unit 220 copies the content packet under distribution according to the route information registered into the second route table (step S1409). Thereby, the first content packet CPI corresponding to the content packet under distribution is copied by the second gateway 200, as illustrated in FIG. 26. The destination IP address "1.1.1.1" of the copied first content packet is rewritten into the IP address "3.3.3.3" registered into the destination IP address 2 by the packet transfer unit 220.

Figures 30A, 30B:
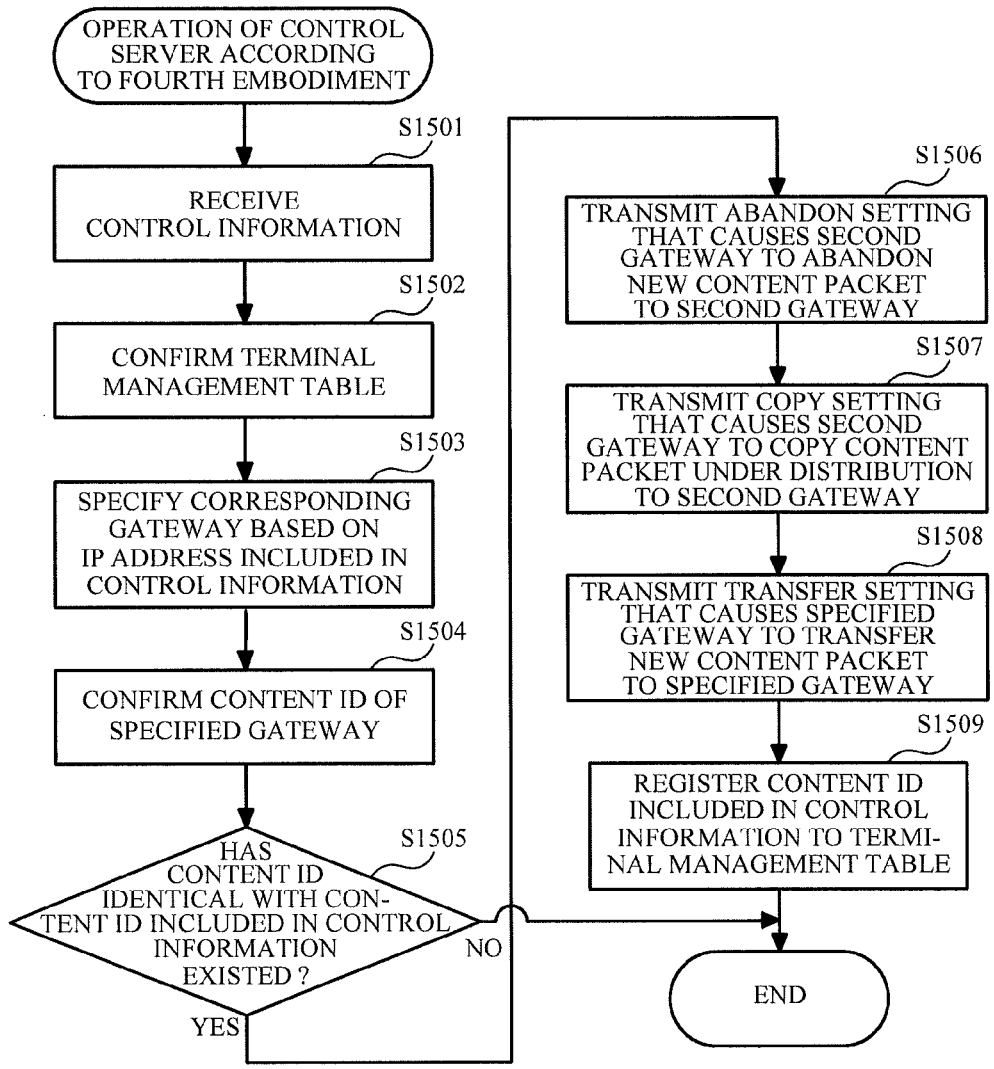
FIG. 30A is a flowchart illustrating processing steps performed by the control server according to the fourth embodiment.
FIG. 30B is a diagram illustrating an example of the terminal management table.

FIG. 30A is a flowchart illustrating processing steps performed by the control server 400 according to the fourth embodiment. More specifically, FIG. 30A is a flowchart illustrating processing steps performed when the control information is transmitted from the second gateway 200, as explained with reference to FIG. 29A. FIG. 30B is a diagram illustrating an example of the terminal management table. Here, the flowchart illustrated in FIG. 30A is basically the same as the flowchart illustrated in FIG. 12A.

First, the abandon control unit 421 receives the control information from the second gateway 200 (step S1501). Next, the abandon control unit 421 confirms the terminal management table (step S1502). Next, the abandon control unit 421 specifies the corresponding gateway based on the IP address included in the control address (step S1503). When the control information includes the IP address "3.3.3.3", for example, the gateway ID "GW3" is specified in FIG. 30B. Next, the abandon control unit 421 confirms the content ID of the specified gateway (step S1504). Since the content of the content ID "100" is not already distributed to the terminal IP address "3.3.3.3", the service durative content ID is non-registration (e.g. see FIG. 12B). Therefore, it is confirmed that the content ID of the gateway ID "GW3" is non-registration.

Next, the abandon control unit 421 determines whether a content ID identical with the content ID included in the control information has existed (step S1505). Here, in the fourth embodiment, the abandon control unit 421 determines whether a content ID identical with the content ID included in the control information has existed in the terminal management table. When the content ID "100" is included in the control information, for example, the route information having the content ID "100" is already registered into the terminal management table, and hence the abandon control unit 421 determines that the identical content ID has existed. When it is determined that the content ID identical with the content ID included in the control information has existed (YES in step S1505), the abandon control unit 421 transmits the abandon setting that causes the second gateway 200 to abandon the new content packet to the second gateway 200 (step S1506). Next, the abandon control unit 421 transmits the copy setting that causes the second gateway 200 to copy the content packet under distribution to the second gateway 200 (step S1507). Thereby, the third content packet CP3 corresponding to the new content packet is abandoned by the second gateway 200. The first content packet CP1 corresponding to the content packet under distribution is copied by the second gateway 200. Next, the copy control unit 422 transmits the transfer setting that causes the specified gateway to transfer the new content packet to the specified gateway, based on the transmission of the abandon setting and the copy setting by the abandon control unit 421 (step S1508). At this time, the copy control unit 422 includes the TOS, the content ID and the transfer destination IP address which is a transfer destination of the content packet, into the transfer setting. Thereby, the transfer setting including the transfer destination IP address is transmitted to the third gateway 500, for example. Next, the abandon control unit 421 registers the content ID included in the control information to the terminal management table (step S1509). The registration is performed to the service durative content ID of the terminal device corresponding to the destination IP address included in the control information. Therefore, the content ID "100" is registered into the service durative content ID of the terminal management information having the terminal IP address "3.3.3.3", as illustrated in FIG. 30B. Thereby, the control server 400 can manage that the content of the content ID "100" is distributed to the terminal device 13 having the terminal IP address "3.3.3.3".

Figures 31A, 31B:
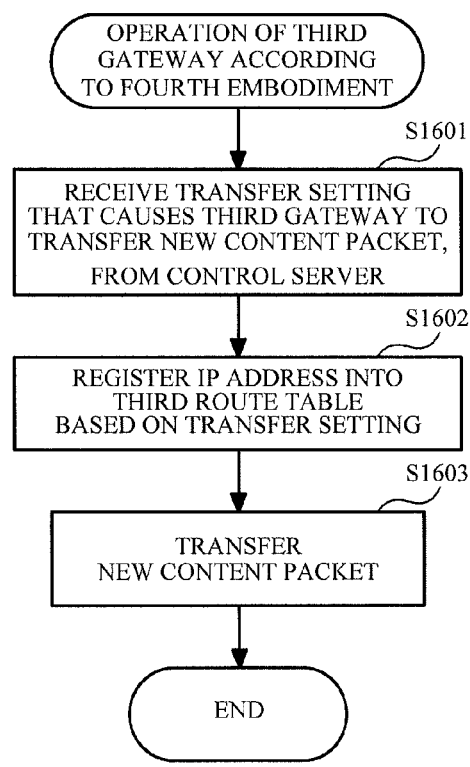
FIG. 31A is a flowchart illustrating processing steps performed by a third gateway according to the fourth embodiment.
FIG. 31B is a diagram illustrating an example of the first route table.

FIG. 31A is a flowchart illustrating processing steps performed by the third gateway 500 according to the fourth embodiment. More specifically, FIG. 31A is a flowchart illustrating processing steps performed when the transfer setting is transmitted from the control server 400, as explained with reference to FIG. 30A. FIG. 31B is a diagram illustrating an example of the first route table. Here, the third gateway 500 basically has the same function as the above-mentioned first gateway 100. Therefore, it is explained that marks corresponding to the route table storage unit 110, the packet transfer unit 120 and the route management unit 130 are added to the respective functions which the third gateway 500 has.

First, a route management unit 530 receives the transfer setting that causes the third gateway 500 to transfer the new content packet from the control server 400 (step S1601). Next, the route management unit 530 registers an IP address into the third route table based on the transfer setting (step S1602). As described above, the distribution destination IP address is included in the transfer setting. Therefore, when the distribution destination IP address "3.3.3.3" is included in the transfer setting, the distribution destination IP address "3.3.3.3" is registered into the destination IP address and the branch destination IP address 1, as illustrated in FIG. 31B. In addition, the TOS "10" and the content ID "100" included in the transfer setting are also registered. Next, a packet transfer unit 520 transfers the new content packet (step S1603). More specifically, the packet transfer unit 520 confirms the third route table, and transfers the new content packet to the IP address "3.3.3.3". Thereby, the content packet including the content identical with the content distributed to the terminal devices 11 and 12 is distributed to the terminal device 13, as illustrated in FIG. 26.

Figure 32:
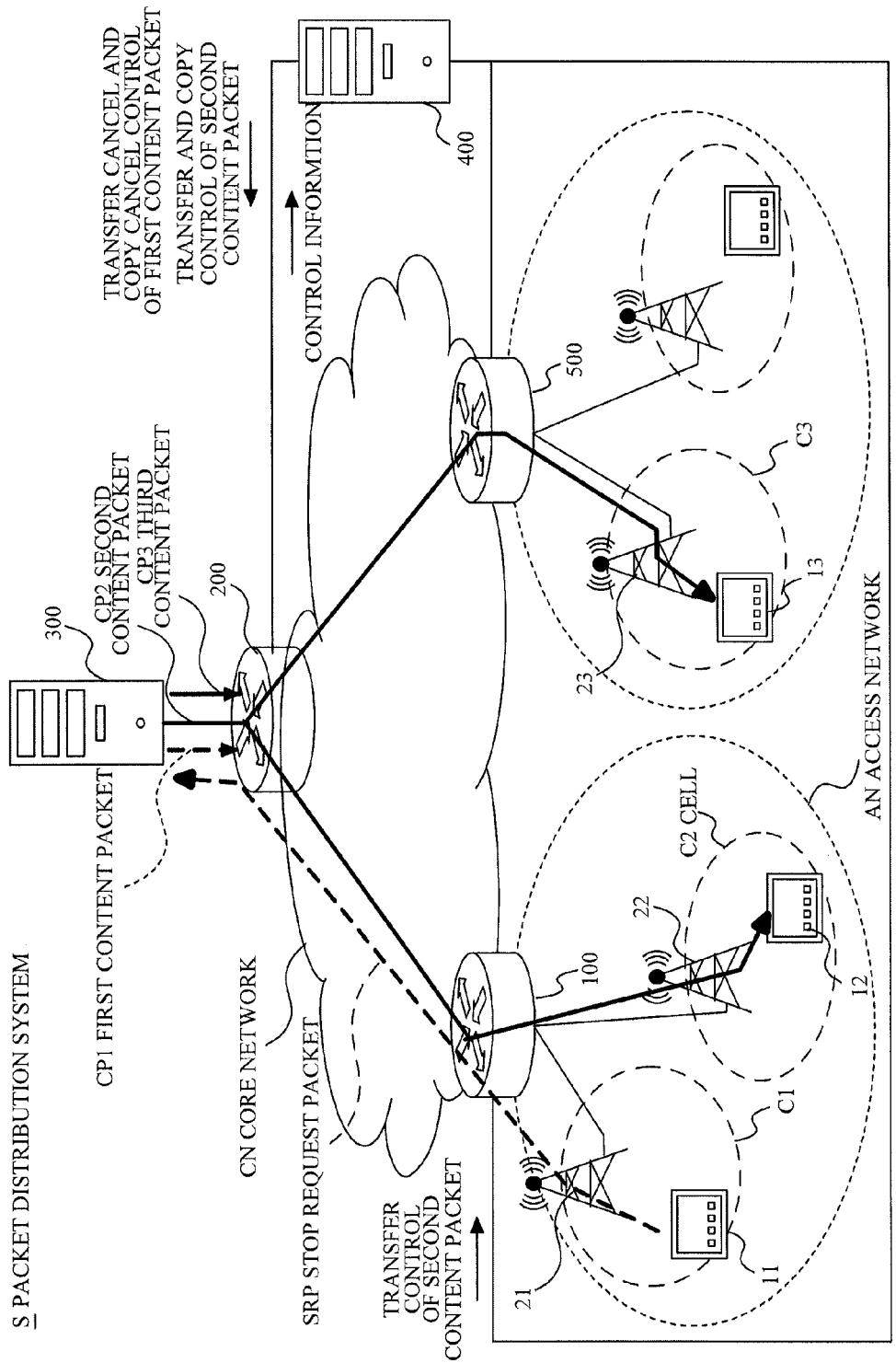
FIG. 32 is a diagram illustrating an example of the operation of the packet distribution system according to the fourth embodiment.

FIG. 32 is a diagram illustrating an example of the operation of the packet distribution system S according to the fourth embodiment.

When the terminal device 11 having the terminal IP address "1.1.1.1" transmits the stop request packet SRP to the content server 300 in a state where the first content packet CP1 is distributed to the terminal devices 11 to 13, as illustrated in FIG. 26, the content server 300 distributes the first content packet CP1 including the distribution stop information to the terminal device 11 based on the stop request packet SRP. After the distribution, the content server 300 stops the distribution of the first content packet CP1.

When the second gateway 200 receives the first content packet CPI, the second gateway 200 detects the distribution stop information included in the first content packet CP1, and transmits the control information to the control server 400.

The control server 400 compares the destination IP address "1.1.1.1" included in the control information with the terminal management table, and specifies the first gateway 100 corresponding to the destination IP address "1.1.1.1". The control server 400 transmits the transfer cancel setting that causes the second gateway 200 to cancel the transfer of the first content packet CP1 and the copy cancel setting that causes the second gateway 200 to cancel the copying of the first content packet CP1, to the second gateway 200. The control server 400 transmits the transfer setting that causes the second gateway 200 to transfer the second content packet CP2 and the copy setting that causes the second gateway 200 to copy the second content packet CP2, to the second gateway 200. The control server 400 transmits the transfer setting that causes the first gateway 100 to transfer the second content packet CP2, to the first gateway 100.

The second gateway 200 updates the second route table based on the received transfer cancel setting, the copy cancel setting, the transfer setting and the copy setting. Thereby, the transfer and the copying of the first content packet is canceled. The second content packet is transferred. The second content packet CP2 is copied. Since the second content CP2 which is the copy source has the destination IP address "2.2.2.2", the second content CP2 is transferred to the terminal device 12. At the time of copying, the destination IP address of the copied second content packet CP2 is rewritten into the IP address "3.3.3.3" of the terminal device 13. Therefore, the copied second content packet CP2 is transferred to the terminal device 13. The first gateway 100 updates the first route table based on the received transfer setting. Thereby, the second content packet CP2 is transferred to the terminal device 12 by the first gateway 100. That is, the second content packet CP2 is distributed to the terminal device 12, as illustrated in FIG. 32. Here, the first content packet CP1 is already abandoned by the second gateway 200. Therefore, the first gateway 100 does not receive the first content packet CP1.

Next, a description will be given of the operation of each element included in the packet distribution system S in order of the content server 300, the second gateway 200, the control server 400, and the first gateway 100, with reference to FIGS. 33 to 36B.

Figure 33:
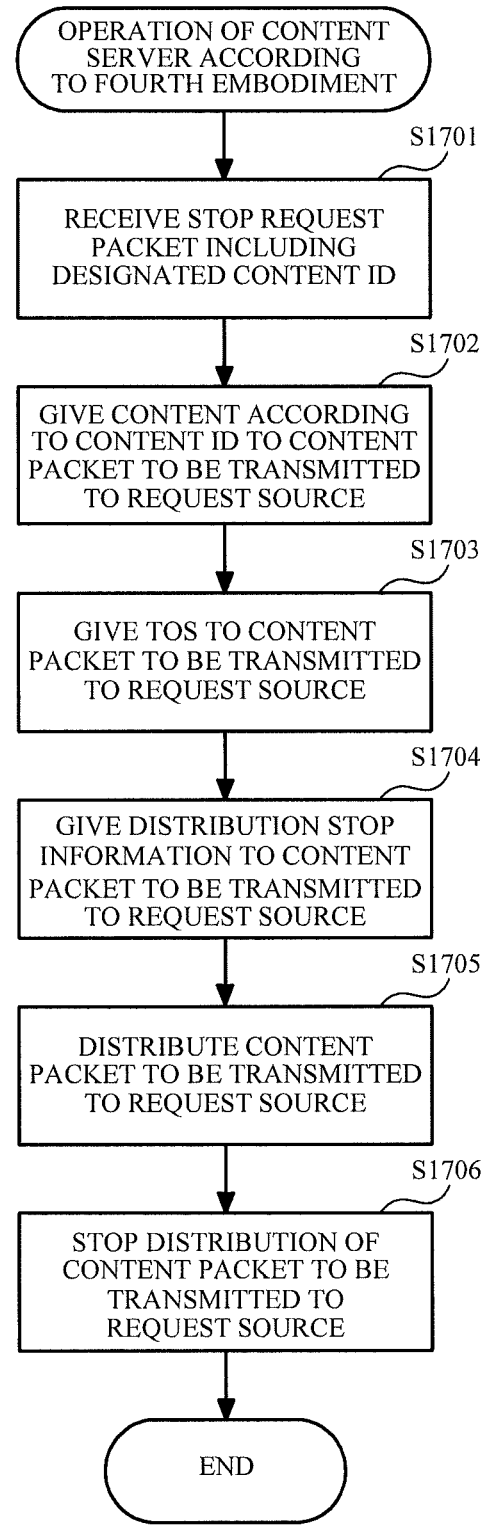
FIG. 33 is a flowchart illustrating processing steps performed by the content server according to the fourth embodiment.

FIG. 33 is a flowchart illustrating processing steps performed by the content server 300 according to the fourth embodiment. Here, the flowchart illustrated in FIG. 33 is basically the same as the flowchart illustrated in FIG. 21. First, the content distribution unit 320 receives the stop request packet including the designated content ID (step S1701). In the fourth embodiment, the stop request packet is transmitted from the terminal device 11 to which the content packet of the copy source is distributed. The stop request packet used in the fourth embodiment is the same as the stop request packet used in the second embodiment, as explained with reference to FIG. 16A.

Next, the content distribution unit 320 gives the content according to the content ID to the content packet to be transmitted to the request source (step S1702). Here, the request source is the terminal device 11 which has transmitted the stop request packet. Next, the identification information giving unit 330 gives the TOS to the content packet to be transmitted to the request source (step S1703). Next, the identification information giving unit 330 gives the distribution stop information to the content packet to be transmitted to the request source (step S1704). This is the same as the second embodiment explained with reference to FIG. 16B. Next, the content distribution unit 320 distributes the content packet to be transmitted to the request source (step S1705). Next, the content distribution unit 320 stops the distribution of the content packet to be transmitted to the request source (step S1706).

Figures 34A, 34B:
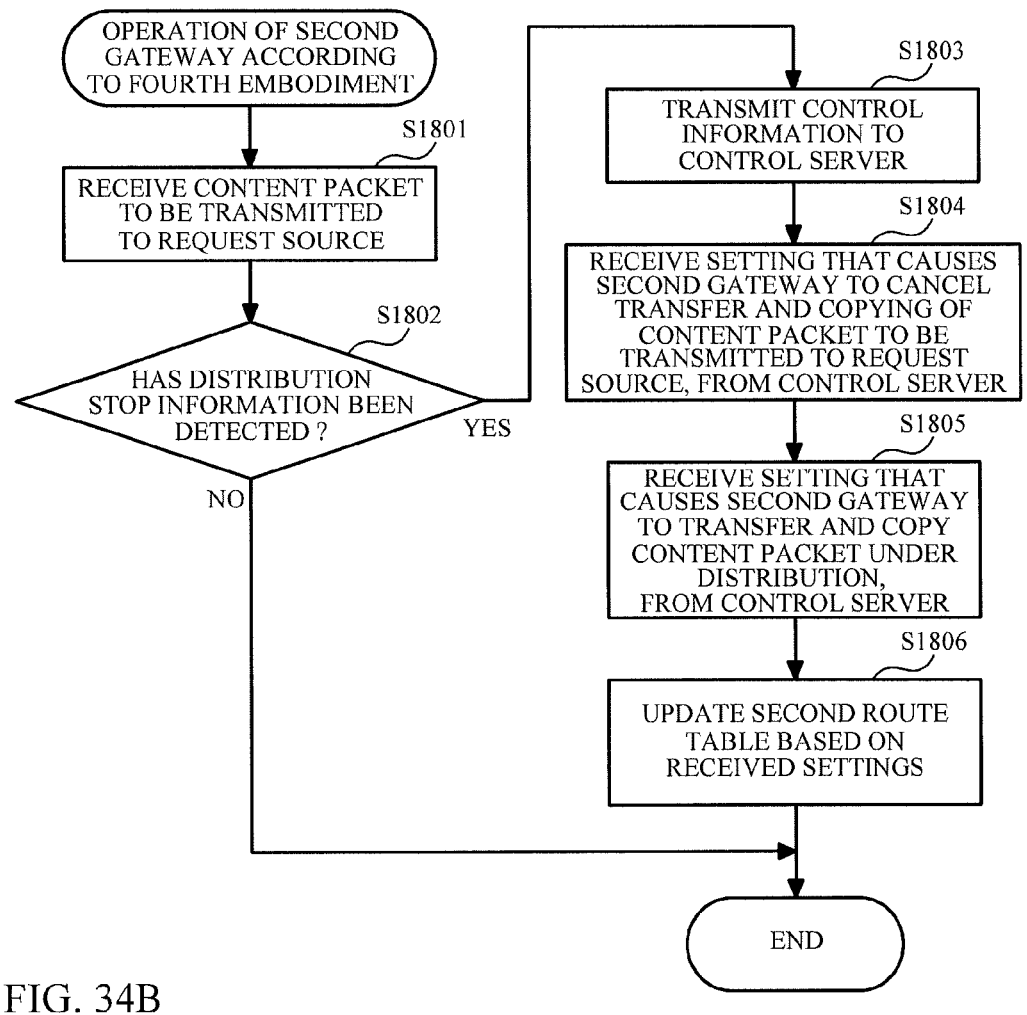
FIG. 34A is a flowchart illustrating processing steps performed by the second gateway according to the fourth embodiment.
FIG. 34B is a diagram illustrating an example of the second route table.

FIG. 34A is a flowchart illustrating processing steps performed by the second gateway 200 according to the fourth embodiment. FIG. 34B is a diagram illustrating an example of the second route table. Here, the flowchart illustrated in FIG. 34A is basically the same as the flowchart illustrated in FIG. 23A.

First, the content packet detection unit 230 receives the content packet to be transmitted to the request source, distributed from the content server 300 (step S1801). Next, the content packet detection unit 230 determines whether the distribution stop information has been detected (step S1802). When the flag "1" is included in the content packet to be transmitted to the request source, for example, it is determined that the distribution stop information has been detected. When the flag "0" is included in the content packet to be transmitted to the request source, it is determined that the distribution stop information has not been detected. When it is determined that the distribution stop information has been detected (YES in step S1802), the content packet detection unit 230 transmits the control information to the control server 400 (step S1803). Thereby, the pair of the TOS, the destination IP address and the content ID is transmitted to the control server 400.

Next, the route management unit 240 receives a setting that causes the second gateway 200 to cancel the transfer and the copying of the content packet to be transmitted to the request source, from the control server 400 (step S1804). The IP address of the request source is included in the setting. Since the request source is the terminal device 11 in the fourth embodiment, the destination IP address "1.1.1.1" is included in the setting. Next, the route management unit 240 receives a setting that causes the second gateway 200 to transfer and copy the content packet under distribution, from the control server 400 (step S1805). When the route management unit 240 receives the settings, the route management unit 240 updates the second route table based on the received settings (step S1806).

Here, a description will be given of a concrete example of update processing by the route management unit 240, with reference to FIGS. 29B and 34B. First, the route management unit 240 compares the destination IP address (e.g. the destination IP address "1.1.1.1") included in the above-mentioned setting with the second route table. Next, the route management unit 240 specifies the route information having the identical destination IP address, as a deletion target. Thereby, in FIG. 29B, the route information including the TOS "10", the destination IP address "1.1.1.1", the content ID "100" and the transfer mode "transfer" is specified as the deletion target. Next, the route management unit 240 confirms the distribution destination IP address 2 included in the specified route information, and determines whether route information having the same IP address exists in the distribution destination IP address 1. In FIG. 29B, the IP address "3.3.3.3" registered into the distribution destination IP address 2 is confirmed, and an IP address identical with this IP address exists in the distribution destination IP address 1. When the route information exists, the route management unit 240 rewrites the transfer mode of the route information as "transfer", and registers the distribution destination IP address 2 of the route information specified as the deletion object into the distribution destination IP address 2. Thereby, the transfer mode of the route information of the destination IP address "2.2.2.2" is rewritten from "abandon" to "transfer", and the IP address "3.3.3.3" is registered into the distribution destination IP address 2, as illustrated in FIG. 34B. Next, when the transfer mode of the specified route information as deletion object is "transfer", the route management unit 240 deletes the route information, as illustrated in FIG. 34B.

Figures 35A, 35B:
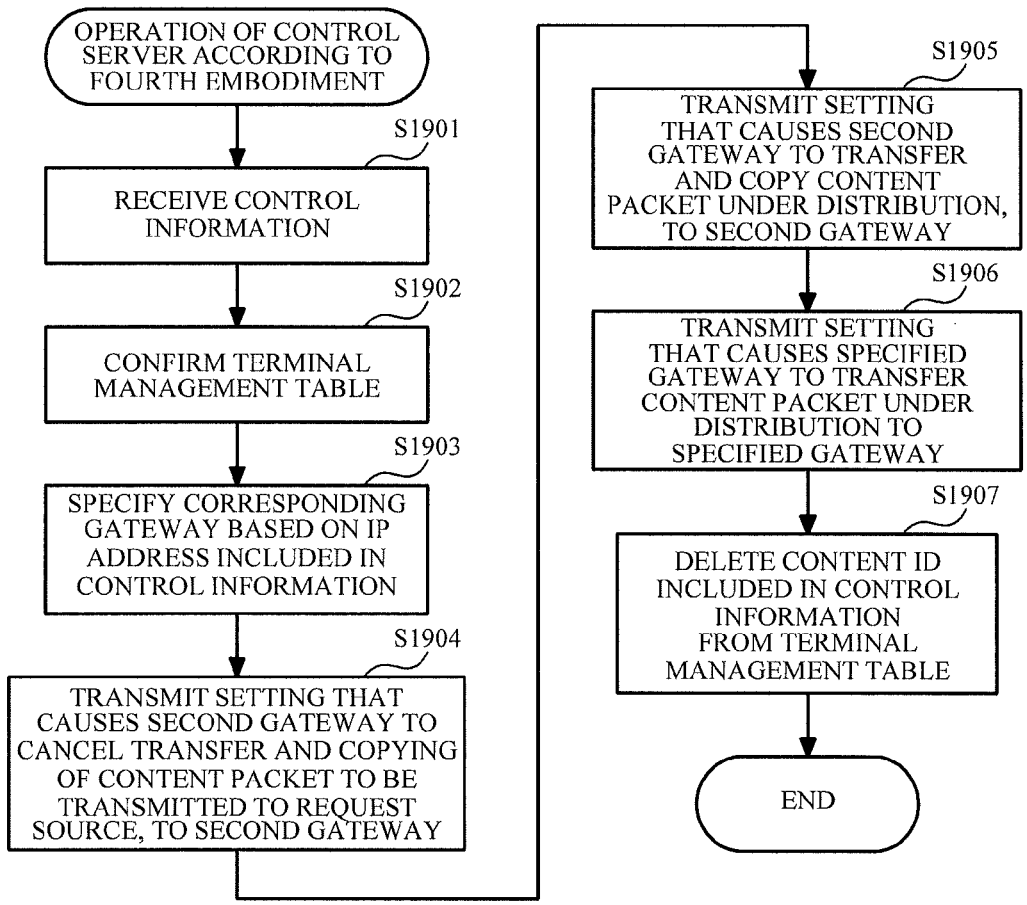
FIG. 35A is a flowchart illustrating processing steps performed by the control server according to the fourth embodiment.
FIG. 35B is a diagram illustrating an example of the terminal management table.

FIG. 35A is a flowchart illustrating processing steps performed by the control server 400 according to the fourth embodiment. FIG. 35B is a diagram illustrating an example of the terminal management table.

First, the abandon control unit 421 receives the control information from the second gateway 200 (step S1901). Next, the abandon control unit 421 confirms the terminal management table (step S1902). Next, the abandon control unit 421 specifies a corresponding gateway based on the IP address included in the control information (step S1903). For example, when the control information includes the IP address "1.1.1.1", the gateway ID "GW1" is specified in FIG. 35B.

Next, the abandon control unit 421 transmits a setting that causes the second gateway 200 to cancel the transfer and the copying of the content packet to be transmitted to the request source, to the second gateway 200 (step S1904). Next, the abandon control unit 421 transmits a setting that causes the second gateway 200 to transfer and copy the content packet under distribution, to the second gateway 200 (step S1905). The copy control unit 422 transmits a setting that causes a specified gateway to transfer the content packet under distribution, to the specified gateway based on the transmission of the setting by the abandon control unit 421 (step S1906). At this time, the copy control unit 422 includes the destination IP address included in the control information into the setting. Thereby, the setting including the destination IP address is transmitted to the first gateway 100, for example. Next, the abandon control unit 421 deletes the content ID included in the control information from the terminal management table (step S1907). The deletion is preformed to the service durative content ID of the terminal IP address corresponding to the destination IP address included in the control information. Therefore, the content ID "100" is deleted from the service durative content ID of the terminal management information having the terminal IP address "1.1.1.1", as illustrated in FIG. 35B. Thereby, the control server 400 can manage that the content of the content ID "100" is not distributed to the terminal device 11 having the terminal IP address "1.1.1.1".

Figures 36A, 36B:
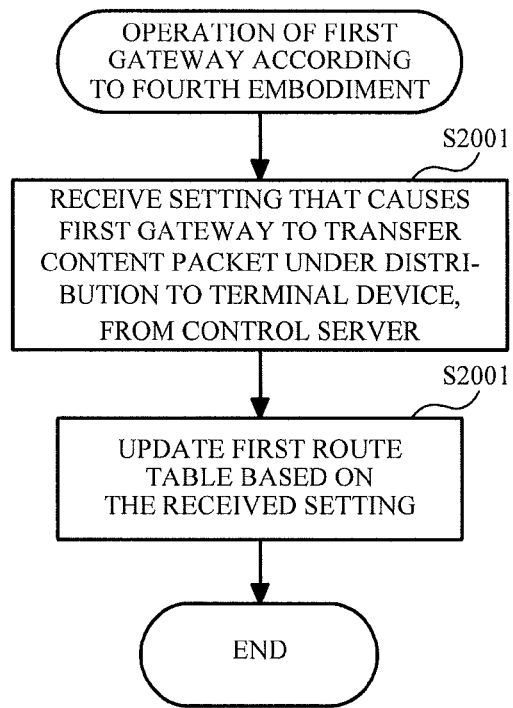
FIG. 36A is a flowchart illustrating processing steps performed by the first gateway according to the fourth embodiment.
FIG. 36B is a diagram illustrating an example of the first route table.

FIG. 36A is a flowchart illustrating processing steps performed by the first gateway 100 according to the fourth embodiment. More specifically, FIG. 36A is a flowchart illustrating processing steps performed when a setting that causes the first gateway 100 to transfer the content packet under distribution is transmitted from the control server 400, as explained with reference to FIG. 35A. FIG. 36B is a diagram illustrating an example of the first route table.

First, the route management unit 130 receives a setting that causes the first gateway 100 to transfer the content packet under distribution to the terminal device 11, from the control server 400 (step S2001). Next, the route management unit 130 deletes the IP address from the first route table based on the setting (step S2002). As described above, the destination IP address is included in the transfer setting. Therefore, when the destination IP address "1.1.1.1" is included in the transfer setting, the destination IP address "1.1.1.1" is deleted from the branch destination IP address 1, as illustrated in FIG. 36B. Thereby, the distribution of the content packet to the terminal device 11 is stopped as illustrated in FIG. 32. Here, the first content packet CP1 of the copy source is not distributed from the content server 300. The IP address is deleted from the branch destination IP address 1, so that it is canceled that the IP address remains in the branch destination IP address 1 although the content server 300 has already stopped distribution.

As described above, based on the distribution destination IP addresses 1 and 2, the transfer mode of the route information having the IP address, as the distribution destination IP address 1, which is identical with the distribution destination IP address 2 included in the route information to be deleted is rewritten from "abandon" to "transfer", and the IP address identical with the distribution destination IP address 2 is registered into the route information. Thereby, even when there is a stop request of the content from the terminal device 11 to which the first content packet CP1 of the copy source is distributed, in a state where the first content packet CP1 is distributed to the terminal devices 11 to 13, the second content packet CP2 including the content identical with the content included in the first content packet CPI is distributed to the terminal device 12. Moreover, the copied second content packet CP2 including the content identical with the content included in the first content packet CP1 is distributed to the terminal device 13. Therefore, the users of the terminal devices 12 and 13 can continuously view the content without being affected by the stop request.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A packet distribution system comprising:
   a first gateway that transfers a packet, and is placed on a boundary of a core network and first and second mobile type terminal devices, each of the first and the second mobile type terminal devices transmitting a distribution request packet which requests a distribution of a same content;
   a second gateway that transfers a packet, and is placed on a boundary of the core network a content server, the content server distributing a first content packet relating to content to any one of the first and the second mobile type terminal devices which has transmitted the distribution request packet, according to the distribution request packet transmitted from any one of the first and the second mobile type terminal devices;
   a control server that controls operation of the first and the second gateways;
   the control server including:
   an abandon controller that, when the first content packet is distributed to one of the first and the second mobile type terminal devices, the distribution request packet is transmitted from another one of the first and the second mobile type terminal devices, and a second content packet newly distributed from the content server to the another one of the first and the second mobile type terminal devices is detected by the second gateway, causes the second gateway to abandon the second content packet based on control information included in the detected second content packet; and
   a copy controller that causes the first gateway to copy the first content packet distributed to one of the first and the second mobile type terminal devices and to transfer the copied first content packet to the another one of the first and the second mobile type terminal devices.

2. The packet distribution system as claimed in claim 1,
   wherein the second content packet includes distribution stop information indicating distribution stop of the content,
   when a stop request packet that stops the distribution of the content is transmitted from the another one of the first and the second mobile type terminal devices, and the distribution stop information included in the second content packet distributed from the content server to the another one of the first and the second mobile type terminal devices is detected by the second gateway before the distribution stop of the content, the abandon controller causes the second gateway to cancel the abandon of the second content packet, based on the control information included in the second content packet, and
   the copy controller causes the first gateway to cancel copying the first content packet to the another one of the first and the second mobile type terminal devices, based on operation of the abandon controller.

3. The packet distribution system as claimed in claim 1,
   wherein the first content packet includes distribution stop information indicating distribution stop of the content,
   when a stop request packet that stops the distribution of the content is transmitted from the one of the first and the second mobile type terminal devices, and the distribution stop information included in the first content packet distributed from the content server to the one of the first and the second mobile type terminal devices is detected by the second gateway before the distribution stop of the content, the abandon controller causes the second gateway to cancel the transfer of the first content packet and transfer the second content packet to the another one of the first and the second mobile type terminal devices, based on the control information included in the first content packet, and
   the copy controller causes the first gateway to transfer the second content packet transferred from the second gateway to the another one of the first and the second mobile type terminal devices, based on operation of the abandon controller.

4. The packet distribution system as claimed in claim 1, further comprising: a third gateway that transfers a packet, and is placed on a boundary of a core network and a third mobile type terminal device, the third mobile type terminal device transmitting a distribution request packet which requests the distribution of a content,
   wherein the first content packet includes distribution stop information indicating distribution stop of the content,
   when the first content packet is distributed to both of the first and the second mobile type terminal devices, the distribution request packet which requests the distribution of the content is transmitted from the third mobile type terminal device, and a third content packet newly distributed from the content server to the third mobile type terminal device is detected by the second gateway, the abandon controller causes the second gateway to abandon the third content packet distributed from the content server to the third mobile type terminal device, to copy the first content packet distributed to the one of the first and the second mobile type terminal devices and to transfer the copied first content packet to the third mobile type terminal device via the third gateway, based on control information included in the detected third content packet,
   when a stop request packet that stops the distribution of the content is transmitted from the one of the first and the second mobile type terminal devices, and the distribution stop information included in the first content packet distributed from the content server to the one of the first and the second mobile type terminal devices is detected by the second gateway before the distribution stop of the content, the abandon controller causes the second gateway to cancel the transfer and the copying of the first content packet, transfer the second content packet to the another one of the first and the second mobile type terminal devices, copy the second content packet, and transfer the copied second content packet to the third mobile type terminal device via the third gateway, based on the control information included in the first content packet, and the copy controller causes the first gateway to transfer the second content packet transferred from the second gateway, to the another one of the first and the second mobile type terminal devices, based on operation of the abandon controller.

5. A control device comprising:
an abandon controller that, when a first content packet relating to a content according to a distribution request packet is distributed to one of first and second mobile type terminal devices, each of first and second mobile type terminal devices transmitting the distribution request packet which requests a distribution of a same content, the distribution request packet is transmitted from another one of the first and the second mobile type terminal devices, and a second content packet newly distributed to the another one of the first and the second mobile type terminal devices according to the distribution request packet is detected by a second gateway, causes the second gateway to abandon the second content packet based on control information included in the detected second content packet; and
a copy controller that causes the first gateway to copy the first content packet distributed to the one of the first and the second mobile type terminal devices, and to transfer the copied first content packet to the another one of the first and the second mobile type terminal devices, based on operation of the abandon controller;
wherein the first gateway transfers a packet and is placed on a boundary of a core network and the first and the second mobile type terminal devices, and
the second gateway transfers a packet and is placed on a boundary of the core network and a content server, the content server distributing the first or the second content packet according to the distribution request packet.

6. The control device as claimed in claim 5, wherein the second content packet includes distribution stop information indicating distribution stop of the content,
when a stop request packet that stops the distribution of the content is transmitted from the another one of the first and the second mobile type terminal devices, and the distribution stop information included in the second content packet distributed from the content server to the another one of the first and the second mobile type terminal devices is detected by the second gateway before the distribution stop of the content, the abandon controller causes the second gateway to cancel the abandon of the second content packet, based on the control information included in the second content packet, and
the copy controller causes the first gateway to cancel copying the first content packet to the another one of the first and the second mobile type terminal devices, based on operation of the abandon controller.

7. The control device as claimed in claim 5, wherein the first content packet includes distribution stop information indicating distribution stop of the content,
when a stop request packet that stops the distribution of the content is transmitted from the one of the first and the second mobile type terminal devices, and the distribution stop information included in the first content packet distributed from the content server to the one of the first and the second mobile type terminal devices is detected by the second gateway before the distribution stop of the content, the abandon controller causes the second gateway to cancel the transfer of the first content packet and transfer the second content packet to the another one of the first and the second mobile type terminal devices, based on the control information included in the first content packet, and the copy controller causes the first gateway to transfer the second content packet transferred from the second gateway to the another one of the first and the second mobile type terminal devices, based on operation of the abandon controller.

8. The control device as claimed in claim 5, wherein the first content packet includes distribution stop information indicating distribution stop of the content,
when the first content packet is distributed to both of the first and the second mobile type terminal devices, the distribution request packet which requests the distribution of the content is transmitted from a third mobile type terminal device, and a third content packet newly distributed from the content server to the third mobile type terminal device is detected by the second gateway, the abandon controller causes the second gateway to abandon the third content packet distributed from the content server to the third mobile type terminal device, to copy the first content packet distributed to the one of the first and the second mobile type terminal devices and to transfer the copied first content packet to the third mobile type terminal device via a third gateway, based on control information included in the detected third content packet,
when a stop request packet that stops the distribution of the content is transmitted from the one of the first and the second mobile type terminal devices, and the distribution stop information included in the first content packet distributed from the content server to the one of the first and the second mobile type terminal devices is detected by the second gateway before the distribution stop of the content, the abandon controller causes the second gateway to cancel the transfer and the copying of the first content packet, transfer the second content packet to the another one of the first and the second mobile type terminal devices, copy the second content packet, and transfer the copied second content packet to the third mobile type terminal device via the third gateway, based on the control information included in the first content packet,
the copy controller causes the first gateway to transfer the second content packet transferred from the second gateway, to the another one of the first and the second mobile type terminal devices, based on operation of the abandon controller, and
the third gateway that transfers a packet, and is placed on a boundary of a core network and the third mobile type terminal device, the third mobile type terminal device transmitting the distribution request packet which requests the distribution of the content.

9. A control method executed by a computer, comprising:
a first step of causing a second transfer device to, when a first content packet relating to a content according to a distribution request packet is distributed to one of first and second terminal devices, each of first and second terminal devices transmitting the distribution request packet which requests a distribution of a same content, the distribution request packet is transmitted from another one of the first and the second terminal devices, and a second content packet newly distributed to the another one of the first and the second terminal devices according to the distribution request packet is detected by the second transfer device, abandon the second content packet based on control information included in the detected second content packet; and a second step of causing the first transfer device to copy the first content packet distributed to the one of the first and the second terminal devices, and to transfer the copied first content packet to the another one of the first and the second terminal devices, based on execution of the first step;

wherein the first transfer device transfers a packet and is placed on a boundary of a core network and the first and the second terminal devices, and the second transfer device transfers a packet and is placed on a boundary of the core network and a content distribution device, the content distribution device distributing the first or the second content packet according to the distribution request packet.

10. The control method as claimed in claim 9, wherein the second content packet includes distribution stop information indicating distribution stop of the content, when a stop request packet that stops the distribution of the content is transmitted from the another one of the first and the second terminal devices, and the distribution stop information included in the second content packet distributed from the content distribution device to the another one of the first and the second terminal devices is detected by the second transfer device before the distribution stop of the content, the first step causes the second transfer device to cancel the abandon of the second content packet, based on the control information included in the second content packet, and the second step causes the first transfer device to cancel copying the first content packet to the another one of the first and the second terminal devices, based on execution of the first step.

11. The control method as claimed in claim 9, wherein the first content packet includes distribution stop information indicating distribution stop of the content, when a stop request packet that stops the distribution of the content is transmitted from the one of the first and the second terminal devices, and the distribution stop information included in the first content packet distributed from the content distribution device to the one of the first and the second terminal devices is detected by the second transfer device before the distribution stop of the content, the first step causes the second transfer device to cancel the transfer of the first content packet and transfer the second content packet to the another one of the first and the second terminal devices, based on the control information included in the first content packet, and the second step causes the first transfer device to transfer the second content packet transferred from the second transfer device to the another one of the first and the second terminal devices, based on execution of the first step.

12. The control method as claimed in claim 9, wherein the first content packet includes distribution stop information indicating distribution stop of the content, when the first content packet is distributed to both of the first and the second terminal devices, the distribution request packet which requests the distribution of the content is transmitted from a third terminal device, and a third content packet newly distributed from the content distribution device to the third terminal device is detected by the second transfer device, the first step causes the second transfer device to abandon the third content packet distributed from the content distribution device to the third terminal device, to copy the first content packet distributed to the one of the first and the second terminal devices and to transfer the copied first content packet to the third terminal device via a third transfer device, based on control information included in the detected third content packet, when a stop request packet that stops the distribution of the content is transmitted from the one of the first and the second terminal devices, and the distribution stop information included in the first content packet distributed from the content distribution device to the one of the first and the second terminal devices is detected by the second transfer device before the distribution stop of the content, the first step causes the second transfer device to cancel the transfer and the copying of the first content packet, transfer the second content packet to the another one of the first and the second terminal devices, copy the second content packet, and transfer the copied second content packet to the third terminal device via the third transfer device, based on the control information included in the first content packet, the second step causes the first transfer device to transfer the second content packet transferred from the second transfer device, to the another one of the first and the second terminal devices, based on execution of the first step, and the third transfer device that transfers a packet, and is placed on a boundary of a core network and the third terminal device, the third terminal device transmitting the distribution request packet which requests the distribution of the content.

* * * * *